United States Patent

Takatsuka et al.

[19]

[11] Patent Number: 6,054,827
[45] Date of Patent: Apr. 25, 2000

[54] CONTROLLER FOR MOTOR-DRIVEN POWER STEERING

[75] Inventors: Yuji Takatsuka, Hyogo; Shunichi Wada, Tokyo, both of Japan

[73] Assignee: Mitsubishi Denki Kabushiki Kaisha, Tokyo, Japan

[21] Appl. No.: 09/068,134

[22] PCT Filed: Jan. 23, 1997

[86] PCT No.: PCT/JP97/00149

§ 371 Date: May 1, 1998

§ 102(e) Date: May 1, 1998

[87] PCT Pub. No.: WO98/33270

PCT Pub. Date: Jul. 30, 1998

[51] Int. Cl.[7] .......................................... H02P 7/00
[52] U.S. Cl. ................. 318/474; 318/432; 318/433; 180/79.1
[58] Field of Search .................. 180/79.1, 168; 318/139, 474, 432, 433, 587, 77

[56] References Cited

U.S. PATENT DOCUMENTS

| | | | |
|---|---|---|---|
| 4,869,334 | 9/1989 | Marumoto et al. | 180/79.1 |
| 5,271,474 | 12/1993 | Nishimoto et al. | 180/79.1 |
| 5,294,871 | 3/1994 | Imaseki | 318/139 |
| 5,357,181 | 10/1994 | Mutoh et al. | 318/139 |
| 5,473,231 | 12/1995 | McLaughilin et al. | 318/433 |
| 5,482,129 | 1/1996 | Shimizu | 180/79.1 |
| 5,596,252 | 1/1997 | Shimizu et al. | 318/433 |

FOREIGN PATENT DOCUMENTS 8-91240  4/1996  Japan.

*Primary Examiner*—Robert E. Nappi
*Assistant Examiner*—Rita Leykin
*Attorney, Agent, or Firm*—Sughrue, Mion, Zinn, Macpeak & Seas, PLLC

[57] ABSTRACT

A current flowing to a motor 8 for generating a steering assist force for a steering mechanism is detected by a motor current detecting circuit 24 to be inputted to a controller 10 as a motor current detection value IMS. The controller 10 arithmetically determines deviation between the motor current detection value IMS and a desired motor current value IMT preset on the basis of a vehicle speed and a detected steering assist torque value and decides abnormality of the motor current detecting circuit 24 when the deviation indicates an abnormal value over a period equal to or longer than a predetermined time. When the abnormality is decided, the controller 10 stops motor control through a closed loop control in which the motor current detection value IMS is used as a feedback input, and then the controller 10 changes over the control to an open loop control in which a desired motor voltage is arithmetically determined on the basis of the desired motor current value IMT and resistance of the motor and applied thereto so that the current of the preset desired motor current value IMT can flow through the motor 8.

19 Claims, 20 Drawing Sheets

3 : TORQUE SENSOR

CONTROLLER FOR MOTOR-DRIVEN POWER STEERING

TECHNICAL FIELD

The present invention relates to a motor-driven power steering control system which is arranged such that when a fault occurs in a current detecting circuit provided in association with an electric motor adapted for generating a steering assist force for a steering mechanism, the motor current is controlled through an open loop for thereby preventing an abnormal current from flowing through the motor.

BACKGROUND TECHNIQUES

FIG. 26 shows a conventional motor-driven power steering control system disclosed, for instance, in Japanese Unexamined Patent Application Publication No. 91240/1996 (JP-A-8-91240). The conventional system is constituted by a torque sensor 3 for detecting a steering torque, an electric motor 8 for generating a steering assist force to a steering mechanism on the basis of the steering torque detection value outputted from the torque sensor 3, an ignition key 14 for performing activating operation for the motor 8, a battery 11 for supplying a driving electric power to the motor 8 in response to operation of the ignition key 14, a vehicle speed sensor 7 for detecting a vehicle speed, and an electronic control circuit 13 for controlling the output power of the motor 8 on the basis of the steering torque detection value and the vehicle speed detection value.

The electronic control circuit 13 includes a phase compensator 21, a current command arithmetic unit 22, a comparator 23, a differential compensator 24, a proportional operation unit 25, an integral operation unit 26, an adder 27, an IG (ignition) key-on detector 31, a fault detector 32, a fail-safe processor 33, a fail relay 34, a motor driving circuit 41 and a motor current detecting circuit 42.

In the conventional system, a motor current command value I is supplied to a feedback control circuit incorporated in the electronic control circuit 13 for a predetermined time T when the ignition key 14 is turned on, allowing a motor current to flow.

At a time point when a predetermined time T0 (T0<T) has lapsed, a motor current detection value i detected by the motor current detecting circuit 42 is inputted to the comparator 23 constituting a part of the feedback control circuit.

The fault detector 32 compares a predicted value Ds of duty ratio of a PWM signal as predicted on the basis of the motor current command value I with an actually measured value of the duty ratio of the PWM signal outputted from the adder 27 incorporated in the feedback control circuit to which the motor current detection value i is fed back.

When the absolute value of a difference resulting from the comparison is greater than a predetermined permissible value ΔD, decision is made that the motor current detecting circuit 42 suffering a fault, whereupon a fail-safe processing is carried out.

Further, as other known technique, there may be mentioned a control system which is implemented such that a desired motor current and a motor current detection value detected by a motor current detecting means are compared with each other even in the course of ordinary control, wherein when error between the desired value and the detection value mentioned above is equal to or greater than a predetermined value, decision is made that abnormality occurs in the motor current detecting circuit, whereupon a fail-safe processing is carried out.

However, the fault detecting method for the motor current detecting circuit known heretofore is carried out as an initial check immediately after the ignition key 14 is turned on. Consequently, when a fault occurs in the motor current detecting circuit during the ordinary control, it is impossible to detect the fault, giving rise to a problem.

Furthermore, with the fault detecting method described above as the prior art technique, it is impossible to perform a normal motor current control during a period from a time point at which the fault occurred to a time point for carrying out the fail-safe processing, as a result of which an abnormal current flows through the motor during the above-mentioned period.

In particular, when such a fault occurs that the motor current detection value becomes zero, an overcurrent will then flow through the motor, which will result in generation of excessively large assist torque. On the other hand, when the fault detection period is set so short that influence of the excessively large assist torque can be neglected, then the possibility of erroneous detection becomes higher, which is unpreferable from the view point of system performance.

Accordingly, with the present invention, it is contemplated to make it possible to detect abnormality of the motor current during the ordinary control while evading flow of an abnormal current through the motor and additionally make it possible to continue the control of the motor output power even in the state where the motor current detecting circuit suffers a fault.

DISCLOSURE OF THE INVENTION

According to the present invention, an open loop control of the motor current is performed when the motor current detecting circuit suffers a fault, to thereby prevent an abnormal current from flowing through the motor even when the fault is taking place in the motor current detecting circuit.

Furthermore, according to the present invention, the open loop control of the motor current is performed on the basis of a desired value of the motor current and a resistance value of the motor to thereby prevent an abnormal current from flowing through the motor.

Furthermore, according to the present invention, a closed loop control is performed by resorting to only a proportional term in the control system when the motor current detecting circuit suffers a fault, to thereby allow the motor to be driven while suppressing an excessively large current flow notwithstanding of occurrence of the fault in the motor current detecting circuit.

Furthermore, according to the present invention, the motor is controlled through a voltage control when the motor current detecting circuit suffers a fault, to thereby allow the motor to be controlled while preventing an abnormal current from flowing through the motor notwithstanding of occurrence of the fault in the motor current detecting circuit.

Further, according to the present invention, it is taught that when the motor current resumes a normal value in the state in which the motor is controlled through a second control means for coping with the detected abnormality of the motor current, the motor is controlled through a first ordinary control means. Thus, even when the motor current abnormality is detected erroneously, degradation of steering comfortableness can be suppressed to a minimum.

Further, according to the present invention, the assist torque is gradually lowered by lowering progressively the motor current after the detection of a fault of the motor current detecting circuit, to thereby suppress a sudden change of the steering force.

Furthermore, according to the present invention, the assist torque is gradually lowered by lowering progressively a voltage applied to the motor after the detection of a fault of the motor current detecting circuit, to thereby suppress a sudden change of the steering force.

Further, according to the present invention, the system is stopped after the desired value of the motor current has been lowered in succession to the detection of a fault of the motor current detecting circuit, to thereby suppress a sudden change of the steering force upon stopping of the system.

Furthermore, according to the present invention, the system is stopped after the steering torque has been lowered in succession to detection of a fault of the motor current detecting circuit, to thereby suppress a sudden change of the steering force upon stopping of the system.

Furthermore, according to the present invention, it is taught that when the desired value of the voltage applied to the motor becomes smaller than a predetermined value inclusive thereof in the course of the motor control through a second control process validated upon detection of abnormality, the power steering control is stopped. Thus, it is possible to change over to a manual steering without bringing about a sudden change of the steering force, whereby safety can be enhanced.

BEST IMPLEMENTATION MODES FOR CARRYING OUT THE INVENTION

Implementation Mode 1

Figure 1:
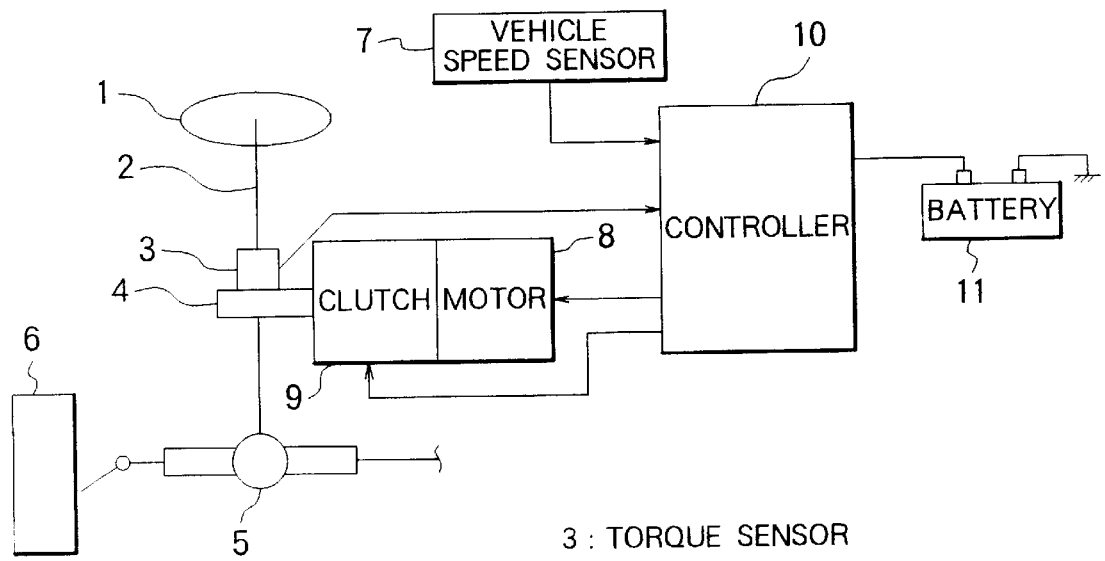
FIG. 1 is a view showing a general arrangement of a motor-driven power steering control system according to the present invention.

FIG. 1 is a view showing a structure of a motor-driven power steering control system according to an instant implementation mode. A steering wheel 1 is operatively coupled to a steering shaft 2 and connected to a rack/pinion assembly 5 by way of a reduction gear 4. The steering shaft 2 is provided with a torque sensor 3 for detecting a steering torque. Further, an electric motor 8 for generating an assist torque is operatively coupled to the reduction gear 4 by way of a clutch 9.

The controller 10 is designed to perform a power steering control by controlling the motor 8 and the clutch 9 on the basis of signals inputted from the torque sensor 3 and a vehicle speed sensor 7.

Parenthetically, the motor 8 and the clutch 9 are operated with electric power supplied from a battery 11. Additionally, front wheels 6 adapted to be steered by the steering wheel 1 are operatively connected to the rack/pinion assembly 5 through the medium of an appropriate coupling mechanism.

Figure 2:
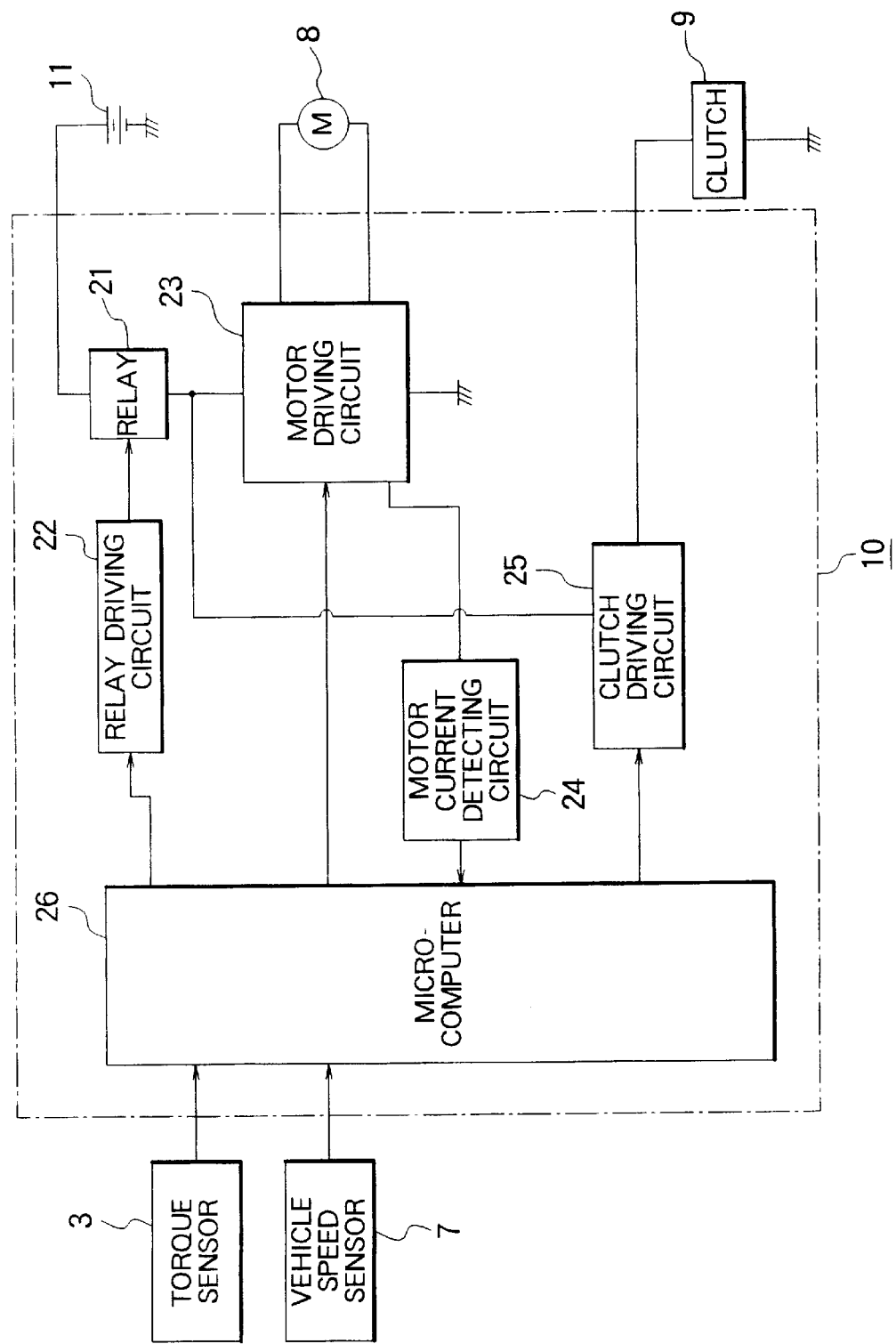
FIG. 2 is a block diagram showing a structure of a controller incorporated in the motor-driven power steering control system.

Next, description will be made of the controller 10 by reference to FIG. 2. The controller 10 includes a relay 21 for interrupting power supply to the motor 8, a relay driving circuit 22 for driving the relay 21, a motor driving circuit 23 for driving the motor 8 with the power supply from the battery 11 by way of the relay 21, a motor current detecting circuit 24 for detecting a current flowing to and through the motor 8 by way of the motor driving circuit 23, a clutch driving circuit 25 for driving the clutch 9, and a microcomputer 26 designed for controlling the relay 21, the motor 8 and the clutch 9 on the basis of a motor current detection value outputted from the motor current detecting circuit 24, a torque detection value outputted from the torque sensor 3 and a vehicle speed detection value outputted from the vehicle speed sensor 7.

Figure 3:
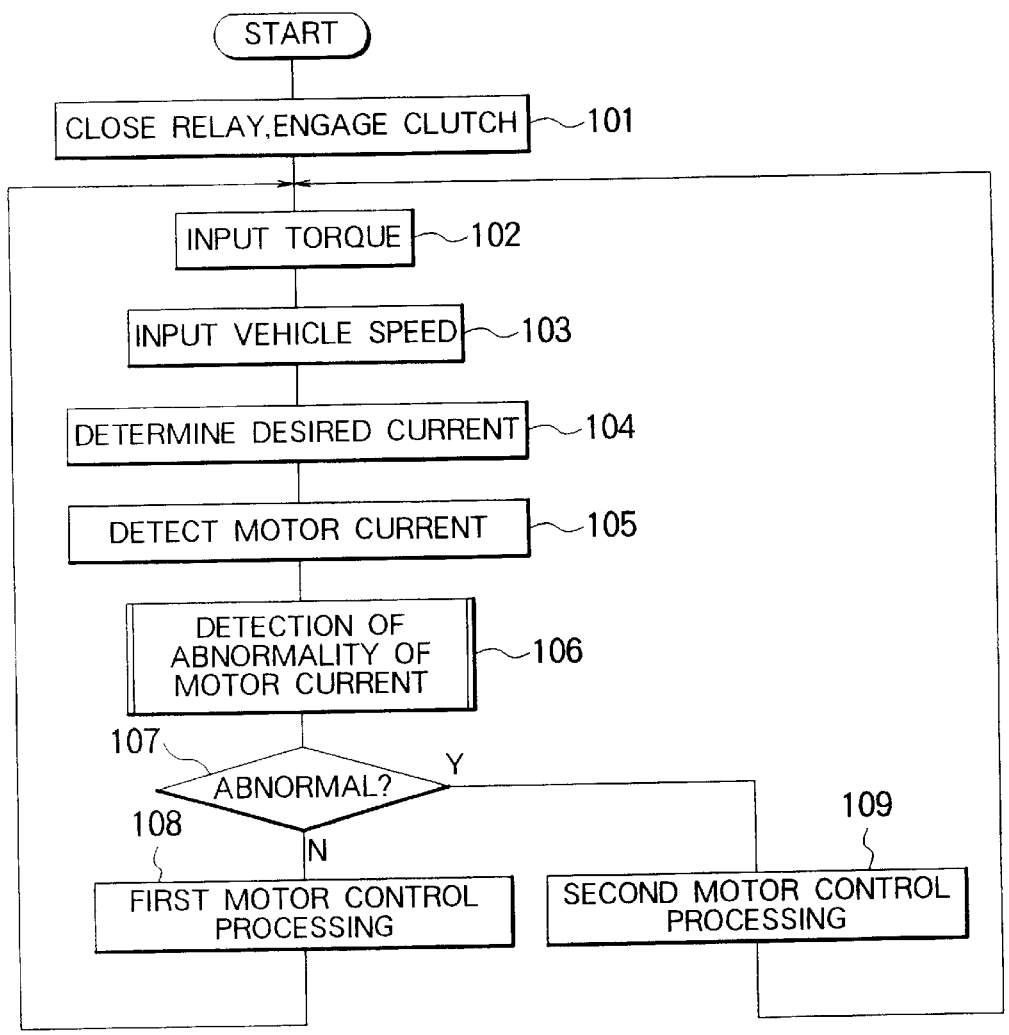
FIG. 3 is a flow chart for illustrating a control processing executed by a microcomputer incorporated in the controller.

Next, operation of the microcomputer 26 will be explained by reference to a flow chart shown in FIG. 3. After starting the internal combustion engine, the relay 21 is closed with the clutch 9 being engaged in a step 101. Thereafter, the steering torque detected by the torque sensor 3 is inputted in a step 102, and then a vehicle speed detected by the vehicle speed sensor 7 is inputted in a step 103.

In a step 104, the current caused to flow through the motor 8 is determined on the basis of the steering torque and the vehicle speed, while the motor current is detected by the motor current detecting circuit 24 in a step 105 to thereby make decision as to whether or not the motor current suffers abnormality in a step 106. When the decision results in absence of the abnormality, the routine branches to a step 108 in response to the output "NO" of the step 107, and a first motor control processing is executed in the step 108. On the other hand, when occurrence of abnormality is found in the step 106, the output of the step 107 is then "YES", in response to which the routine branches to a step 109 where a second motor control processing is executed.

Figure 5:
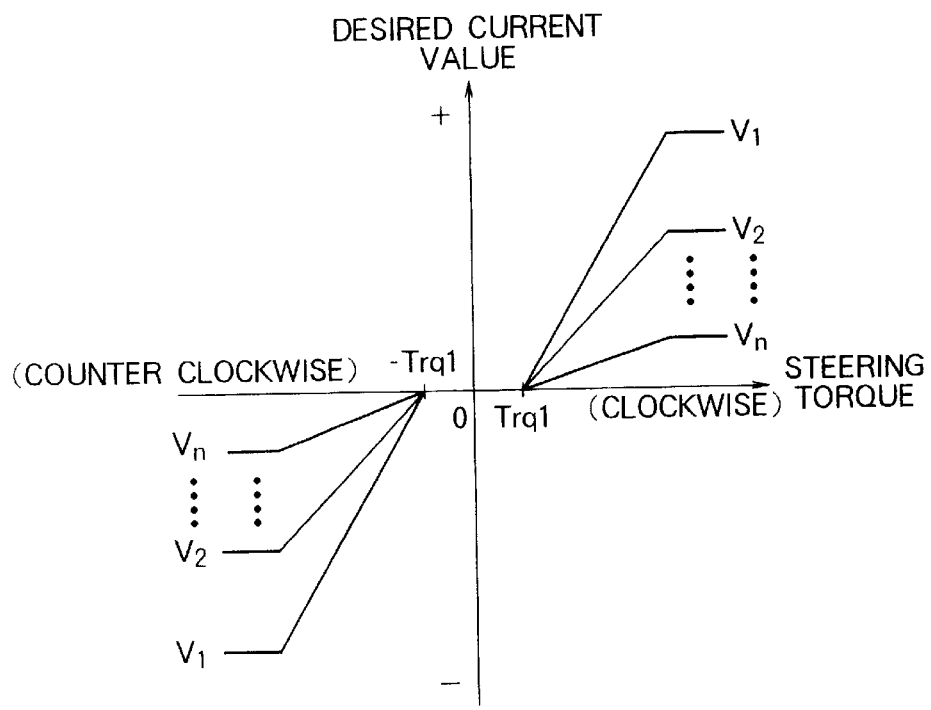
FIG. 5 is a view showing current characteristics to be referenced in determining a desired current value on the basis of a steering torque and a vehicle speed.

FIG. 5 shows graphically relations among the steering torque, the vehicle speed and the motor current in determining the motor current, wherein a curve V1 represents a current characteristic in the stationary state of the motor vehicle. The desired motor current value IMT is so set as to become lower as the vehicle speed increases from V2, . . . , Vn.

Figure 4:
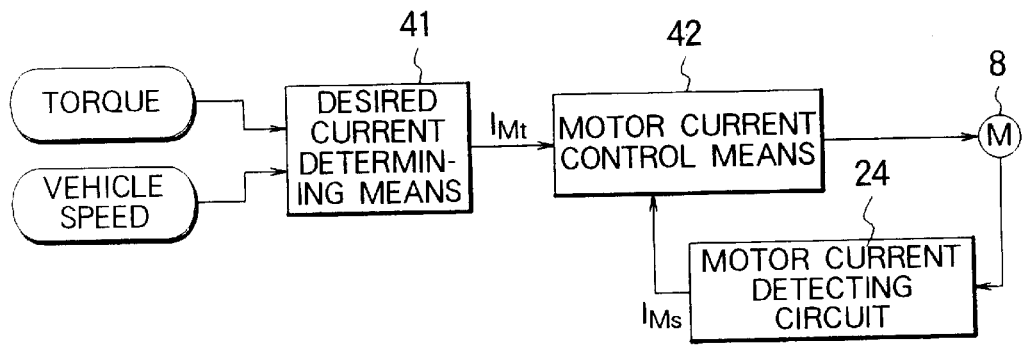
FIG. 4 is a block diagram illustrating various operations of the microcomputer in terms of functional means in case the microcomputer controls a motor current through a closed loop control process.
Figure 6:
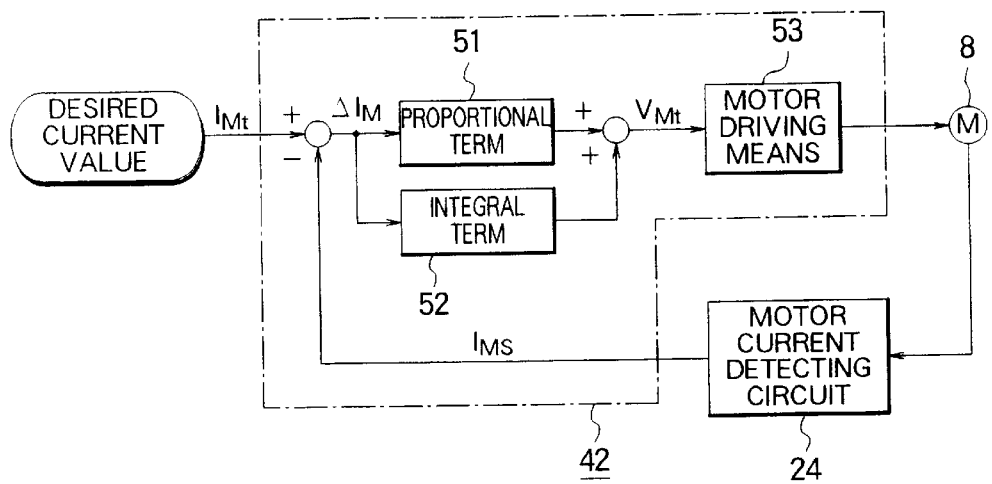
FIG. 6 is a block diagram for illustrating a motor current control means shown in FIG. 4 in terms of a closed loop control scheme in which a proportional term and an integral term are employed.

Next, the first motor control processing in the step 108 will be described by reference to FIGS. 4 and 6. FIG. 4 is a block diagram illustrating the first motor control processing executed by the microcomputer 26 in terms of hardware blocks.

In this block diagram, a desired current determining means 41 is designed to determine the desired motor current value IMT on the basis of the steering torque and the vehicle speed by reference to the characteristic diagram illustrated in FIG. 5. A motor current control means 42 performs motor current control in accordance with the deviation or difference between the desired motor current value IMT and the motor current detection value IMS detected by the motor current detecting circuit 24 so that the motor current flowing to the motor 8 may become the desired motor current value IMT.

In the following, operation of the motor current control means 42 will be described in detail by reference to a block diagram in FIG. 6. A proportional term unit 51 is designed to perform a proportional operation for the deviation ΔIM between the desired motor current value IMT and the motor current detection value IMS, while an integral term unit 52 performs an integral operation for the deviation ΔIM. Further, a motor driving means 53 is designed to apply to the motor 8 a voltage in accordance with a sum VMT of the results of the arithmetic operations performed by the proportional term unit 51 and the integral term unit 52 to thereby drive the motor.

Figure 7:
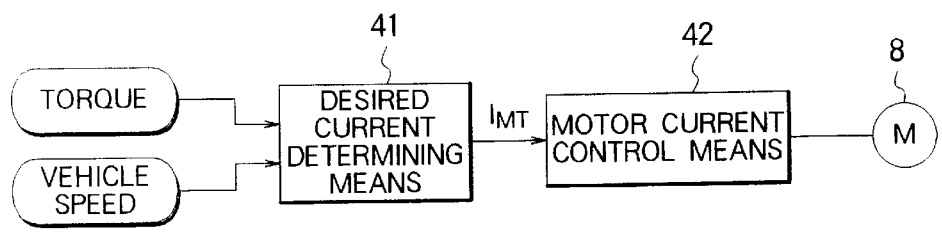
FIG. 7 is a block diagram for illustrating various operations of the microcomputer in terms of functional means in case the microcomputer controls a motor current through an open loop control process.

Next, the second motor control processing will be described by reference to FIG. 7. FIG. 7 is a block diagram showing in terms of hardware blocks the second motor control processing executed by the microcomputer 26 in which the motor current detection value IMS is not used. The second motor control processing is an open loop control which differs from the first motor control processing shown in FIG. 4 in the respect that the input from the motor current detecting circuit 24 is disabled.

Figure 8:
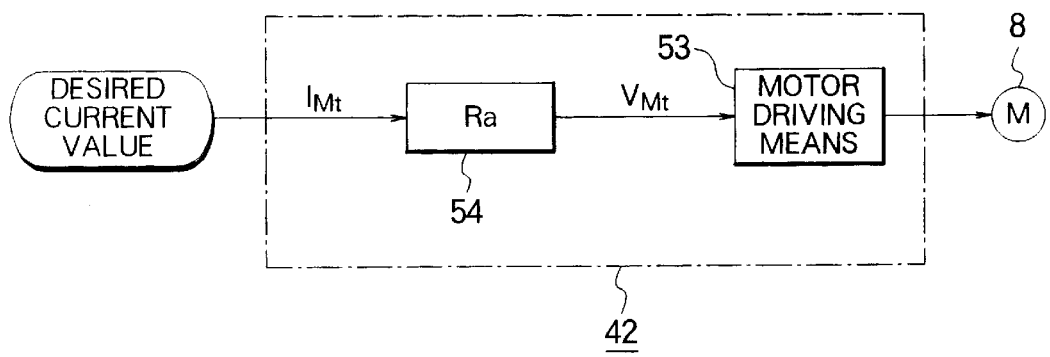
FIG. 8 is a block diagram for illustrating a motor current control means in terms of an open loop control scheme.

The motor current control means 42 determines a desired voltage MT by multiplying the desired motor current value IMT by a predetermined value Ra set at a constant setting unit 54, wherein the motor driving means 53 drives the motor 8 in accordance with the desired voltage MT, as can be seen in FIG. 8.

At this juncture, it should be mentioned that the predetermined value Ra represents an impedance or resistance value of the motor 8. Thus, there can be realized such control that the desired current IMT can flow through the motor 8 by applying to the motor 8 the desired motor voltage VTM determined by multiplying the desired motor current value IMT by the resistance value Ra.

Next, detection of abnormality of the motor current will be described by reference to FIG. 9. In a step 121, a difference a between the desired motor current value IMT and the motor current detection value IMS is determined, whereon decision is made in a step 122 as to whether or not the difference a is greater than a predetermined value ε1.

In a step 123, it is decided whether or not a time period during which the difference a remains greater than the predetermined value ε1 continues longer than a predetermined time T1 inclusive. When the predetermined time T1 (which depends on a period during which the motor current detection value IMS is fed back) is attained or exceeded, then occurrence of abnormality in the motor current is decided in a step 124.

By performing the motor current abnormality detection in the manner described above, abnormality of the motor current can be decided when the state where the difference a between the desired motor current value IMT and the motor current detection value IMS is greater than the predetermined value ε1 has been continued for the predetermined time T1.

In the processing executed in the manner described above in accordance with the instant implementation mode, it is presumed that the motor current assumes a normal value in the starting phase and thus the first motor control procedure is activated at first. In the first motor control processing, the motor current is subjected to the feedback control processing by using the proportional term and the integral term for making the desired motor current value IMT and the motor current detection value IMS equal to each other.

Accordingly, in the step 121 in the motor current abnormality detection processing, the difference a becomes approximately zero, as a result of which the step 122 branches to "NO". Thus, abnormality of the motor current can not be determined. The step 107 shown in FIG. 3 always branches to "NO", whereby the first motor control processing is executed repetitively.

Figure 9:
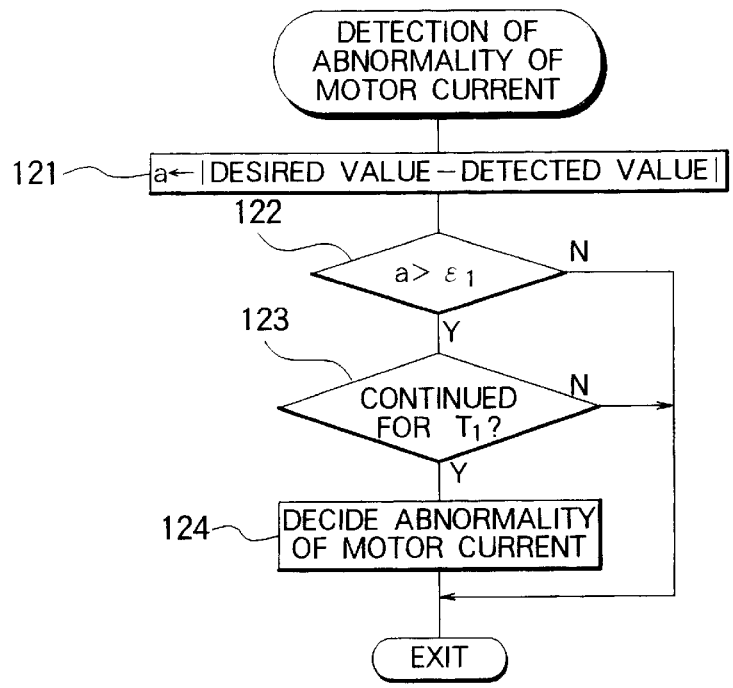
FIG. 9 is a flow chart for illustrating operation for detecting abnormality of a motor current.

When abnormality occurs in the motor current detecting circuit 24 with the motor current detection value IMS exhibiting an abnormal value, the difference a makes appearance between the desired motor current value IMT and the motor current detection value IMS, which difference a can be detected in the step 121 shown in FIG. 9.

When the difference a makes appearance between the desired motor current value IMT and the motor current detection value IMS and when the difference a continues to exist for the time period T1, the motor 8 is then controlled by resorting to the second motor control processing for thereby evading the influence of the motor current detecting circuit 24.

In particular, when such fault occurs that the output of the motor current detecting circuit 24 remains constantly zero, driving of the motor 8 under the control through the first motor control processing causes the deviation ΔIM of the motor current detection value IMS from the desired motor current value IMT to be constantly greater than zero. As a consequence, the integral term increases gradually, incurring an excessively large current flowing through the motor 8.

On the other hand, according to the second motor control processing, such a voltage value VMT that the motor current assumes the desired motor current value IMT determined by the desired current determining means 41 is determined and applied to the motor 8 by way of the motor driving means 53 for driving the motor 8 through the open loop control without using the motor current detection value IMS as the input for the closed loop control.

Accordingly, although the second motor control processing is poor in respect to the control accuracy when compared with the first motor control processing, the motor 8 is protected against flow of excessively large current due to a fault of the motor current detecting circuit 24. In this way, generation of excessively large assist torque in the motor-driven power steering system can be suppressed, whereby safety of the steering operation can be enhanced.

Implementation Mode 2

Figure 10:
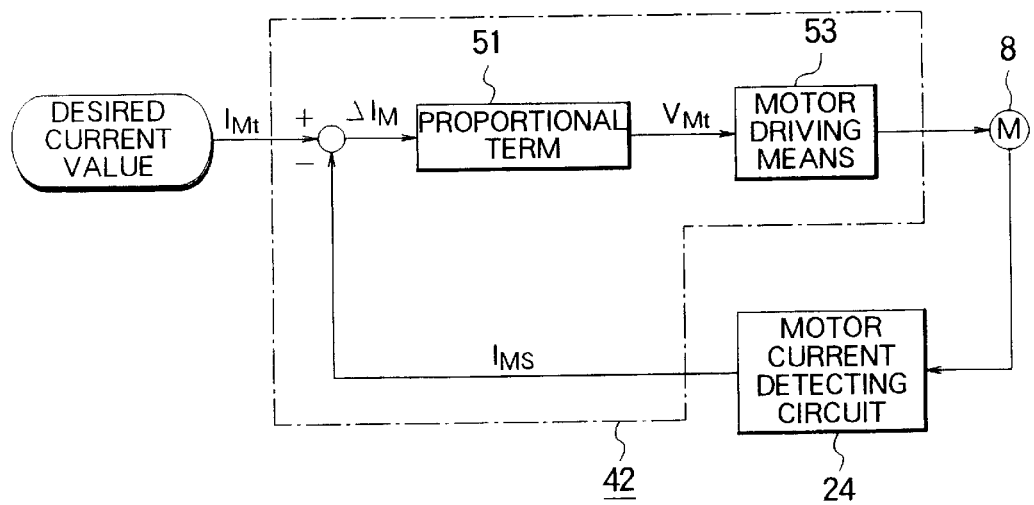
FIG. 10 is a block diagram for illustrating a motor current control means in terms of a closed loop control scheme in which only the proportional term is employed.

In the second motor control processing in the first implementation mode described above, the motor current detection value IMS is not used. The motor current control means 42 for the second control processing according to the instant implementation mode is constituted by eliminating the integral term unit 52 from the motor current control means 42 (FIG. 6) of the first motor control means, as can be seen in the motor current control means 42 shown in FIG. 10.

The deviation ΔIM of the motor current detection value IMS from the desired motor current value IMT is inputted to the proportional term unit 51.

By virtue of the arrangement described above, the motor current control is performed by resorting to the first motor control processing in which the proportional term and the integral term are used when the motor current is normal, while upon occurrence of abnormality in the motor current detection value, the motor current is controlled through the closed loop control realized by the second motor control processing in which only the proportional term is used.

In particular, when such fault takes place that the output of the motor current detecting circuit 24 remains constantly zero, driving of the motor 8 under the control through the first motor control processing causes the deviation ΔIM of the motor current detection value IMS from the desired motor current value IMT to be constantly greater than zero. As a consequence, the integral term increases gradually, incurring an excessively large current flowing through the motor.

On the other hand, in the second motor control processing according to the instant implementation mode, only the proportional term is effective. Accordingly, only the current which is proportional to the desired motor current value can flow through the motor without incurring flow of excessively large current. As a result of this, generation of excessively large assist torque in the motor-driven power steering system can be suppressed, whereby safety of the steering operation can be enhanced.

Implementation Mode 3

In the case of the second motor control processing according to the first and second implementation modes described above, the desired motor current value IMT is determined on the basis of the steering torque and the vehicle speed, whereon the desired motor voltage VTM to be applied to the motor 8 is determined on the basis of the desired motor current value IMT.

Figure 11:
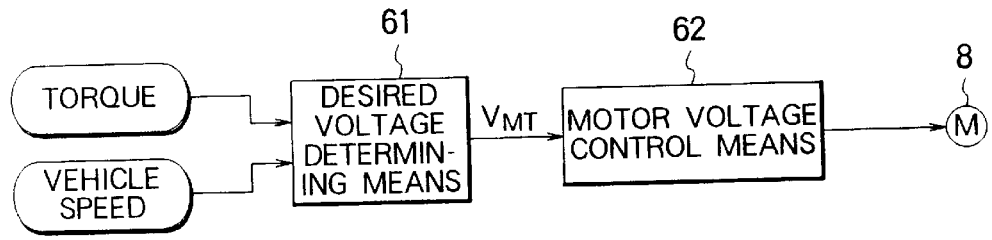
FIG. 11 is a block diagram for illustrating various operations of the microcomputer in terms of functional means in case the microcomputer controls a motor voltage through an open loop control process.

In the case of the instant implementation mode, the second motor control processing is realized in such a manner as illustrated in FIG. 11, wherein the desired motor voltage VTM to be applied to the motor 8 is determined on the basis of the steering torque and the vehicle speed by means of a desired voltage determining means 61.

Figure 12:
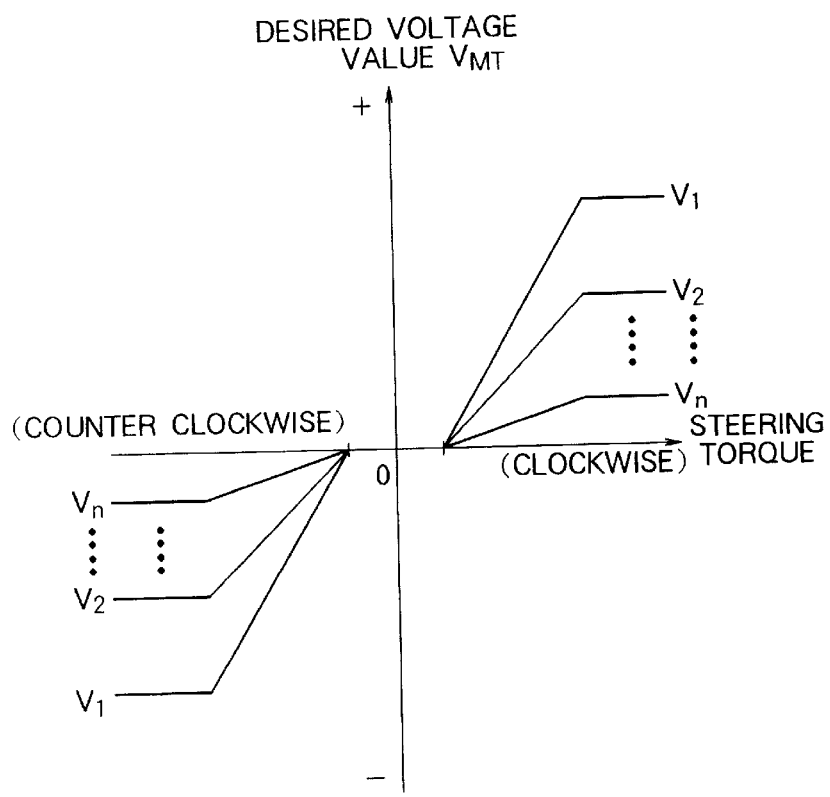
FIG 12 is a view showing voltage characteristics to be referenced in determining a desired voltage value on the basis of a steering torque and a vehicle speed.

FIG. 12 shows voltage characteristics indicating relations between the steering torque and the desired motor voltage VTM with the vehicle speed V being used as parameters. In FIG. 12, V1 indicates voltage characteristic representing a relation between the steering torque and the desired motor voltage VTM in the stationary state of the motor vehicle, wherein the desired voltage for the steering torque lowers characteristically as the vehicle speed increases to V2, . . . , Vn progressively.

A motor voltage control means 62 shown in FIG. 11 is so designed as to apply to the motor 8 a voltage on the basis of the desired motor voltage VTM determined by the desired voltage determining means 61 from the vehicle speed and the steering torque. By realizing the second motor control processing in this manner, the motor current control is carried out through the closed loop control in which both the proportional term and the integral term are used when the motor current is normal, whereas when abnormality takes place in the motor current detection value, the control is carried out by applying to the motor 8 the desired motor voltage VTM determined on the basis of the steering torque and the vehicle speed.

In particular, in the case of such a fault that the output of the motor current detecting circuit 24 remains constantly zero, driving of the motor 8 under the control through the first motor control processing causes the deviation ΔIM of the motor current detection value IMS from the desired motor current value IMT to be constantly greater than zero. As a consequence, the integral term increases gradually, incurring an excessively large current flowing through the motor.

On the other hand, in the case of the second motor control processing, the motor 8 is driven regardless of the motor current detection value. Thus, the excessively large current can not flow. As a result of this, generation of excessively large assist torque in the motor-driven power steering system can be suppressed, whereby safety of the steering operation can be enhanced.

Furthermore, by stopping the motor-driven power steering control when the desired motor voltage VTM of the motor 8 becomes equal to or lower than a predetermined value (e.g. zero volt) in the state in which the second motor control processing is being carried out, it is possible to continue the power steering control so long as the steering operation is performed (i.e., so long as the voltage is applied to the motor 8) and stop the power steering at a time point when the steering force decreases with the voltage applied to the motor 8 becoming lower correspondingly. Thus, the steering can be changed over to the manual steering without being accompanied with sudden change of the steering force, which thus assures improved safety of the steering operation.

Implementation Mode 4

In the case of the first implementation mode described hereinbefore, occurrence of abnormality in the motor current detecting circuit 24 is decided when the deviation of the motor current detection value IMS from the desired motor current value IMT continues to make appearance for a predetermined time period. By contrast, in the case of the instant implementation mode, the content of the motor current abnormality detection processing (the step 106 shown in FIG. 3) is modified from the first implementation mode in such a manner as illustrated in a flow chart shown in FIG. 13.

Referring to the figure, it is decided in a step 131 whether or not the desired motor current value IMT exceeds a predetermined value I1. If so, then decision is made in a step 132 as to whether or not the motor current detection value IMS is smaller than a predetermined value I2.

Since the predetermined value I1 is set at a value greater than the predetermined value I2, output "YES" from both the steps 131 and 132 indicates that no motor current flows even though the motor 8 is being driven.

When the state such as mentioned above continues for a predetermined time T1, the output of a step 133 is then "YES", whereon abnormality of the motor current due to a fault of e.g. the motor current detecting circuit 24 is decided. On the other hand, when the desired motor current value IMT is smaller than the predetermined value I1, the step 131 results in "NO". In that case, the routine now under consideration comes to an end.

When the desired motor current value IMT is greater than the predetermined value I1 and when the motor current detection value IMS is approximately equal to the desired motor current value IMT, the step 131 results in "YES" with the step 132 resulting in "NO".

Unless abnormality of the motor current is decided in the step 134, the step 135 branches to "NO", whereon the routine now of concern comes to an end. Execution of the step 135 in succession to the determination of abnormality of the motor current in the step 134 results in "YES", whereon the motor current abnormality is cleared in a step 136.

In other words, when the state in which the motor current detection value IMS is smaller than the predetermined value I2 which is set smaller than the predetermined value I1 continues for a predetermined time T1 when the motor 8 is driven with the current greater than the predetermined value I1, then abnormality of the motor current is decided. However, when the motor current detection value IMS becomes greater than the predetermined value I2 in the succeeding routine cycle after the abnormality of the motor current has been decided, then it can be decided that abnormality of the motor current has disappeared.

Through the processing procedure described above, the motor current is controlled by the first motor control processing when the motor current is normal. On the other hand, in the case where such a fault occurs that the output of the motor current detection circuit is constantly zero, abnormality of the motor current can be decided by the motor current abnormality detecting processing illustrated in the flow chart of FIG. 3. In that case, the motor control is performed by the second motor control processing which can cope with abnormality of the motor current.

Figure 13:
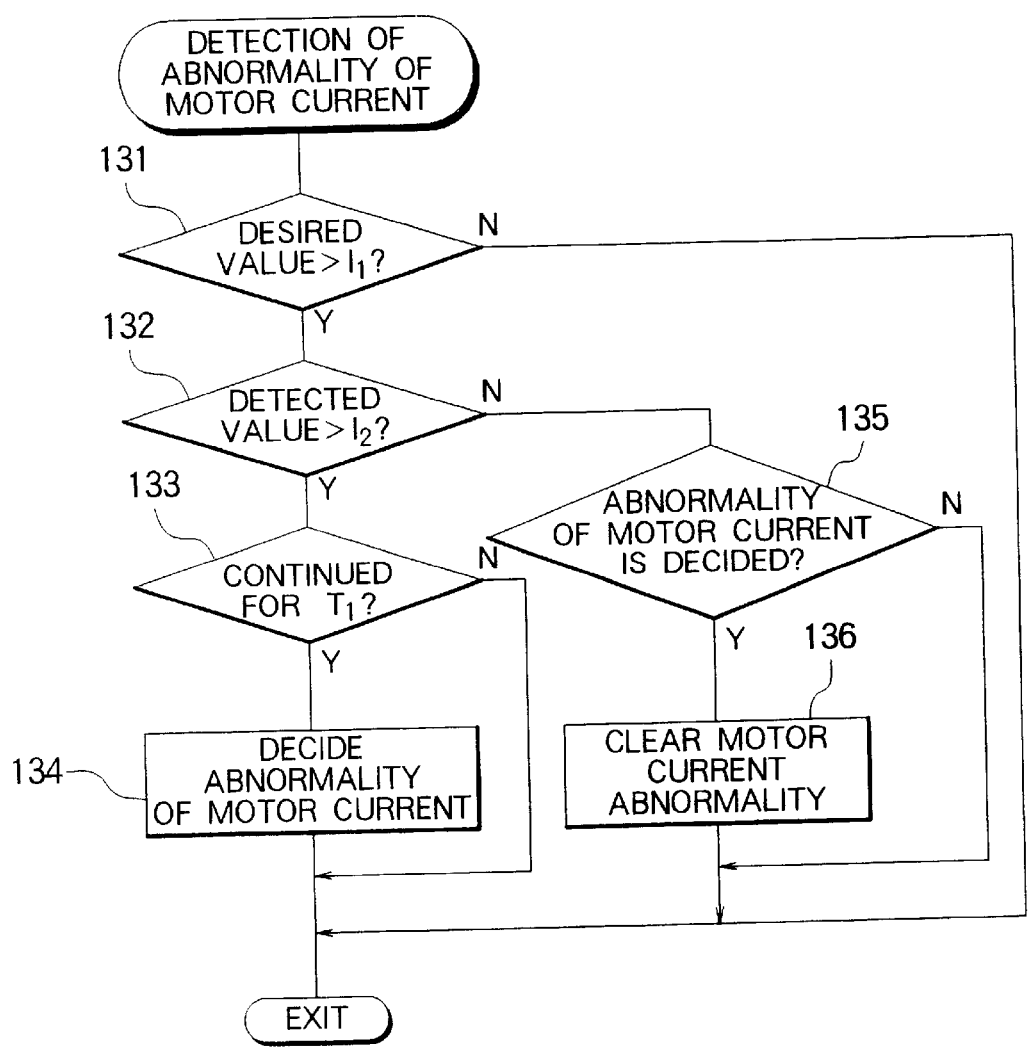
FIG. 13 is a flow chart for illustrating operation for detecting abnormality of the motor current according to a fourth implementation mode.

However, when the output of the motor current detecting circuit 24 becomes greater than the predetermined value I2 in the state where the second motor control processing is being carried out (i.e., in the state where the motor current abnormality has been decided), the motor current abnormality is cleared in the step 136 shown in FIG. 13. Consequently, the first motor control processing is resumed, whereby the motor control processing for the normal state is performed again.

Referring to timing charts shown in FIG. 14(a) to (d), description will be made of operation of the motor-driven power steering system when the first motor control processing is executed in the state where such a fault is taking place that the output of the motor current detecting circuit 24 is constantly zero. Shown in the figure at (a) is an output waveform of the torque sensor 3 when the steering wheel is manipulated clockwise, while shown in the same figure at (b) is a signal waveform of the desired motor current value IMT. Further shown at (c) in the same figure is a signal waveform of the motor current detection value IMS with a signal waveform of the actual motor current being shown at (d) in the same figure.

As the steering wheel 1 is steered in the clockwise direction, the torque T increases gradually. When the steering torque increases beyond the torque Trq1 shown in FIG. 5, the desired motor current value IMT increases gradually.

However, because the motor current detection value is constantly zero, an excessively large current will flow to the motor 8, as can be seen from the waveform shown at (d) in the same figure, due to integral operation validated when the first motor control processing is executed.

The excessively large current flowing through the motor 8 will result in generation of an excessively large assist force, which is accompanied by lowering of the output level of the torque sensor. When the output value of the torque sensor 3 becomes smaller than the aforementioned torque Trq1, the desired motor current value IMT becomes zero, and thus the motor 8 stops.

When the motor 8 stops, the assist torque is no more generated. Consequently, the steering torque increases again. In this way, when such fault occurs which makes the motor current detection value IMS constantly be zero, hunting phenomenon takes place in the level of the desired motor current value IMT.

Figure 14:
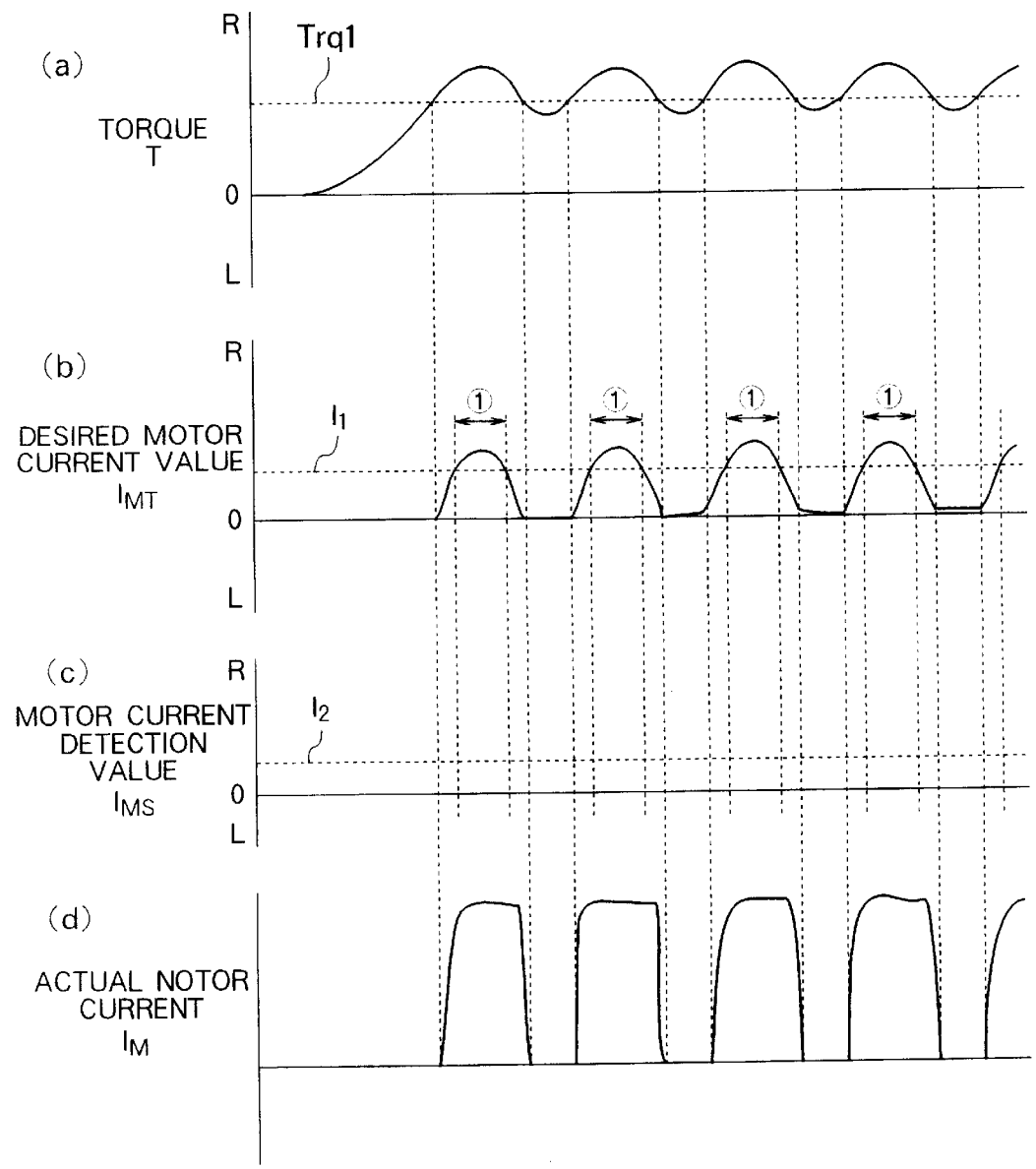
FIG. 14 is a timing chart for illustrating hunting phenomenon of the motor current which makes appearance upon occurrence of a fault in the motor current detecting circuit.

Under the circumstances that both the steps 131 and 132 shown in FIG. 13 branch to "YES", abnormal level fluctuations (i.e., hunting) of the desired motor current value IMT takes place intermittently, as indicated at ① in FIG. 14. Accordingly, in order to detect abnormality of the motor current at an earlier time point, it is necessary to set the predetermined time T1 in the step 133 shown in FIG. 13 shorter than the temporal duration of the hunting phenomenon ① mentioned above.

Figure 15:
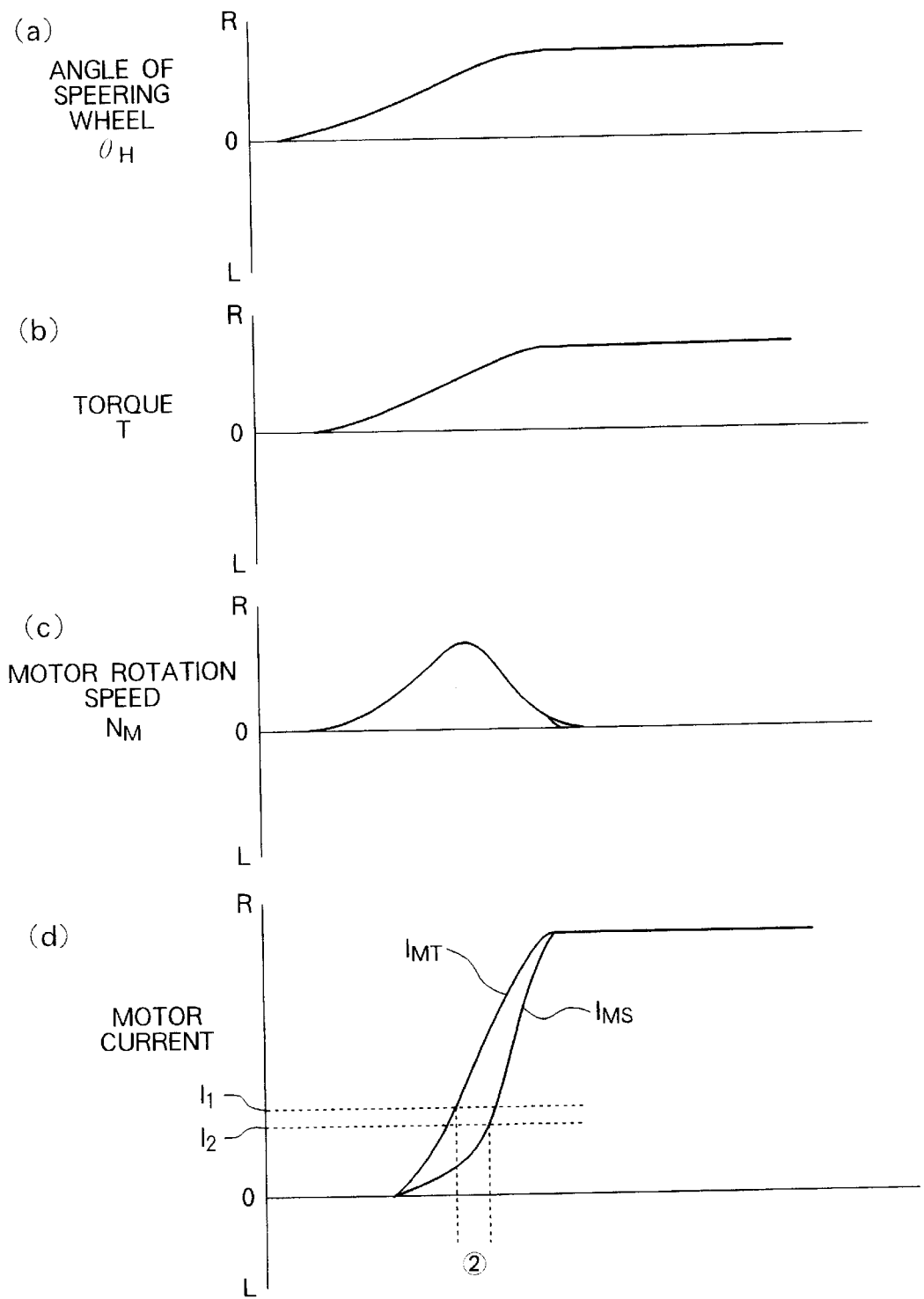
FIG. 15 is a timing chart illustrating states of various control factors inputted upon steep steering operation.

On the other hand, there are shown in FIG. 15 at (a) to (d) timing charts in case the steering wheel is steeply steered in the clockwise direction in the normal state. In the figure, change of the steering angle θH of the steering wheel is shown at (a) while change of the steering torque T is shown at (b) in the same figure. Further shown at (c) in the same figure is change of a rotation speed NM of the motor with waveform representing deviation or difference between the desired motor current value IMT and the motor current detection value IMS being shown at (d) in the same figure.

When the steering wheel 1 is steered clockwise at a predetermined rotation speed, as shown at (a) in the same figure, the motor 8 rotates in conformance with the rotation speed of the steering wheel as illustrated at (c) in the same figure. As the motor 8 rotates, a voltage is generated in the motor 8 in the direction reverse to the motor current. As a result of this, the motor current becomes difficult to flow, whereby error or difference between the desired motor current value IMT and the motor current detection value IMS increases, as is illustrated at (d) in the same figure, when the steering speed is high.

When both the steps 131 and 132 shown in FIG. 13 result in "YES", there may prevail such state in which error or difference between the desired motor current value IMT and the motor current detection value IMS increases during the time period ② shown in the figure (d).

There is a possibility that the time ② becomes longer than the hunting period ① shown at (b) in the same figure. Accordingly, when the predetermined time T1 shown at (b) in the step 133 is set shorter than the time ① with a view to suppressing the hunting phenomenon, then the motor current abnormality may be erroneously detected when the steering wheel is manipulated steeply.

However, in the case of the instant implementation mode even when the motor current abnormality is erroneously detected upon steep steering to thereby validate the second motor control processing due to setting of the predetermined time T1 shorter than the time period ①, the motor current detection value IMS is greater than the predetermined value T2 in the step 132 upon steering operation of the steering wheel 1, whereby the first motor control processing can be resumed so long as the motor current detecting circuit 24 is normal.

To say in another way, when such fault occurs that the output of the motor current detecting circuit 24 is constantly zero, it is possible to control the motor 8 without giving rise to appearance of the hunting phenomenon of the motor current. Besides, in case the erroneous detection of the motor current detecting circuit 24 occurs due to steep steering operation in the state in which the motor current detecting circuit 24 is normal, influence of such erroneous detection can be suppressed to a possible minimum, whereby comfortableness of the driver in his or her steering operation can be protected against degradation.

Implementation Mode 5

In the case of the implementation modes described above, the voltage applied to the motor is so set that upon detection of abnormality the motor current, the second motor control processing is validated to thereby control the motor current so that the motor current assumes the current value determined by the desired current determining means 41 (see FIG. 7).

Figure 16:
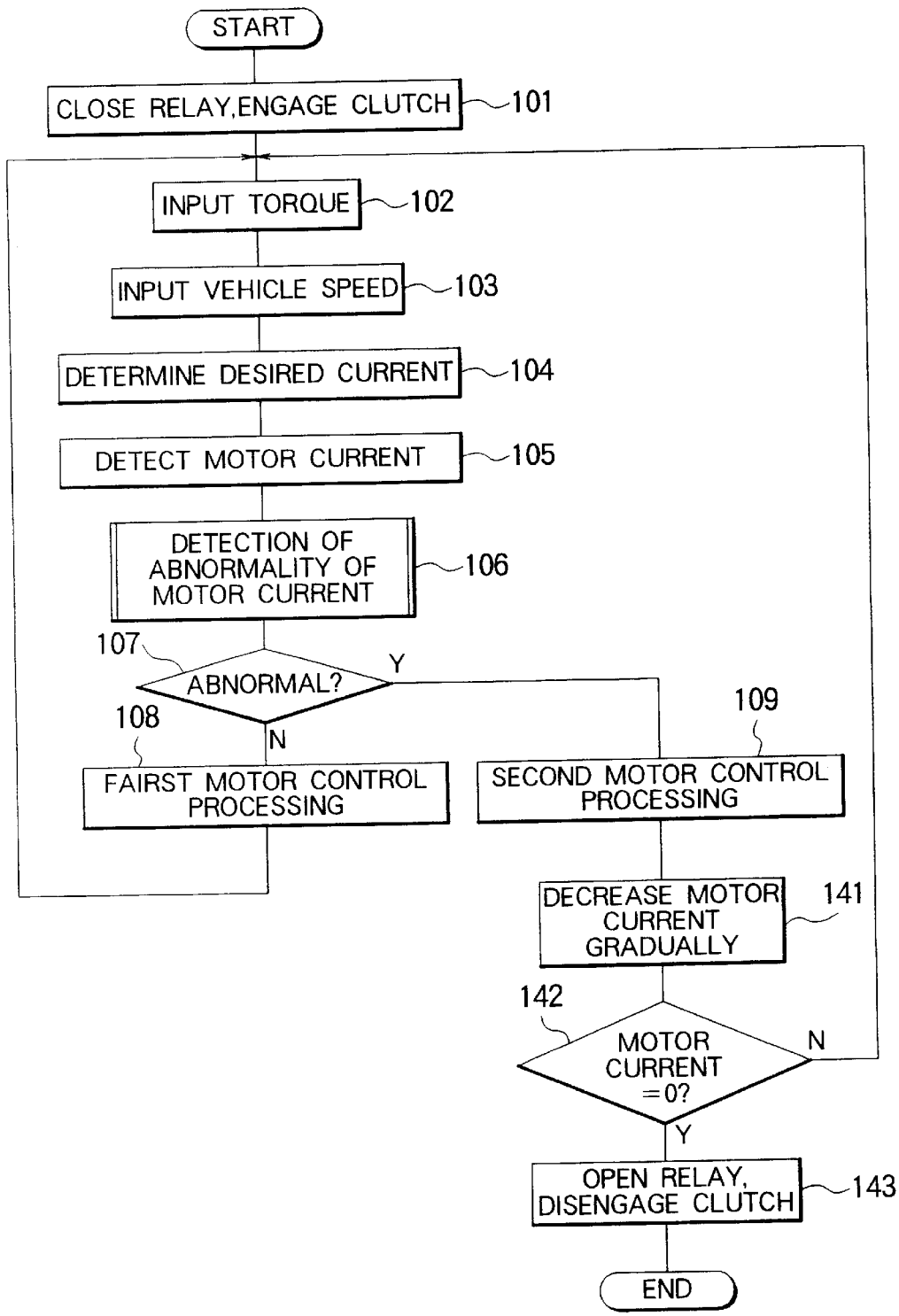
FIG. 16 is a flow chart for illustrating power steering control operation according to a fifth implementation mode.

In the case of the instant implementation mode, the second motor control processing is carried out in such a manner as illustrated in the flow chart of FIG. 16. When the motor control procedure is changed over to the second motor control processing, processing for lowering the motor current gradually is executed in a step 141, which is then followed by a step 142 for deciding whether or not the motor current is zero. If the motor current is zero, the relay 21 is opened with the clutch 9 being disengaged in a step 143.

Figure 17:
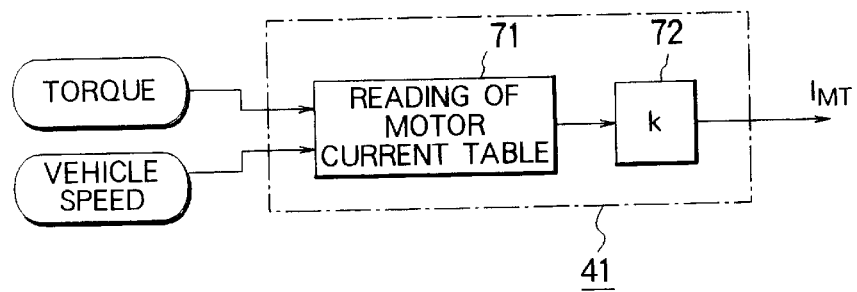
FIG. 17 is a block diagram for illustrating functionally control operation for gradually decreasing the motor current as executed by the microcomputer in the fifth implementation mode.

FIG. 17 is a block diagram for illustrating hardwarewise the second motor control processing according to the instant implementation mode. Referring to the block diagram, the desired current determining means 41 is comprised of a motor-current table reading unit 71 for reading out from a motor current table the desired motor current value IMT preset on the basis of the relations between the steering torque and the vehicle speed shown in FIG. 5 and a multiplication unit 72 for multiplying the desired motor current value IMT as read out by a coefficient k to thereby output the actual desired motor current value IMT.

Figure 18:
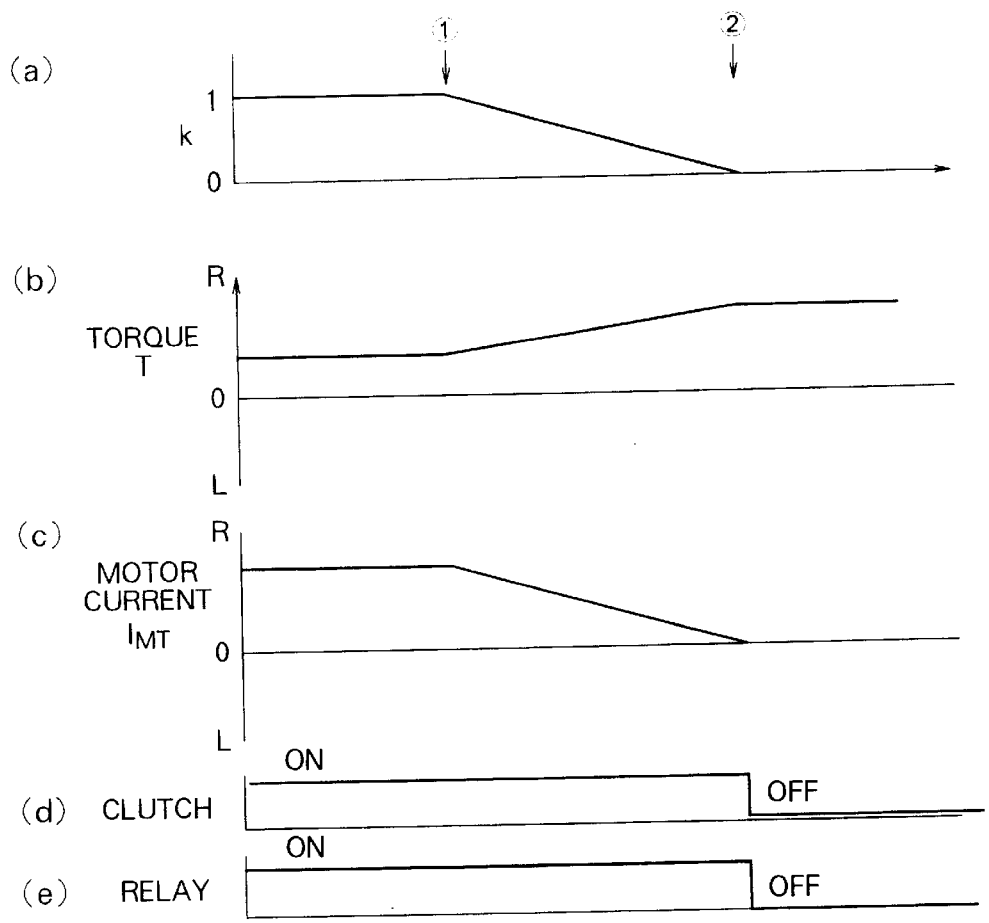
FIG. 18 is a timing chart illustrating states of individual control factors inputted upon steep steering operation after detection of abnormality of the motor current in the fifth implementation mode.

Next, description will be directed to operation by referring to timing charts shown in FIG. 18 at (a) to (e), respectively. Shown in the figure at (a) is change of numerical value of the coefficient k while shown at (b) in the same figure is change of the steering torque T. Further, change of the desired motor current value IMT in accompanying the numerical value change of the coefficient k is shown at (c) in the same figure, the driving state of the clutch 9 is shown at (d) and the driving state of the relay 21 is shown at (e).

At a time point ① shown at (a) in the same figure, abnormality of the motor current is detected, whereupon the first motor control processing is changed over to the second motor control processing. In that case, the coefficient k is reduced gradually from "1" to assume "0" at a time point ②.

As a consequence, the desired motor current value IMT decreases as the coefficient k decreases, whereby the motor current becomes smaller to thereby lower the assist torque generated by the motor 8, which leads to gradual increase of the steering torque. After the motor current becomes zero, the clutch 9 is disengaged with the relay 21 being opened to thereby stop the motor-driven power steering. Thus, the steering operation is changed over to the manual steering mode.

Owing to the processing procedure described above, the control can be continued without generating excessively large assist torque even when abnormality takes place in the motor current detecting circuit 24 as in the case of the first implementation mode.

Furthermore, by lowering gradually the assist torque generated by the motor 8 during a period intervening between the detection of the current abnormality and the change-over to the manual steering mode, the manual steering can be effectuated without being accompanied by steep change of the assist torque, whereby the safety of the steering operation can be enhanced.

Implementation Mode 6

In the case of the implementation mode described above, the voltage applied to the motor is so set that upon detection of the motor current, the second motor control processing is validated to thereby control the motor current so that the motor current assumes the current value determined by the desired current determining means 41 (see FIG. 7).

Figure 19:
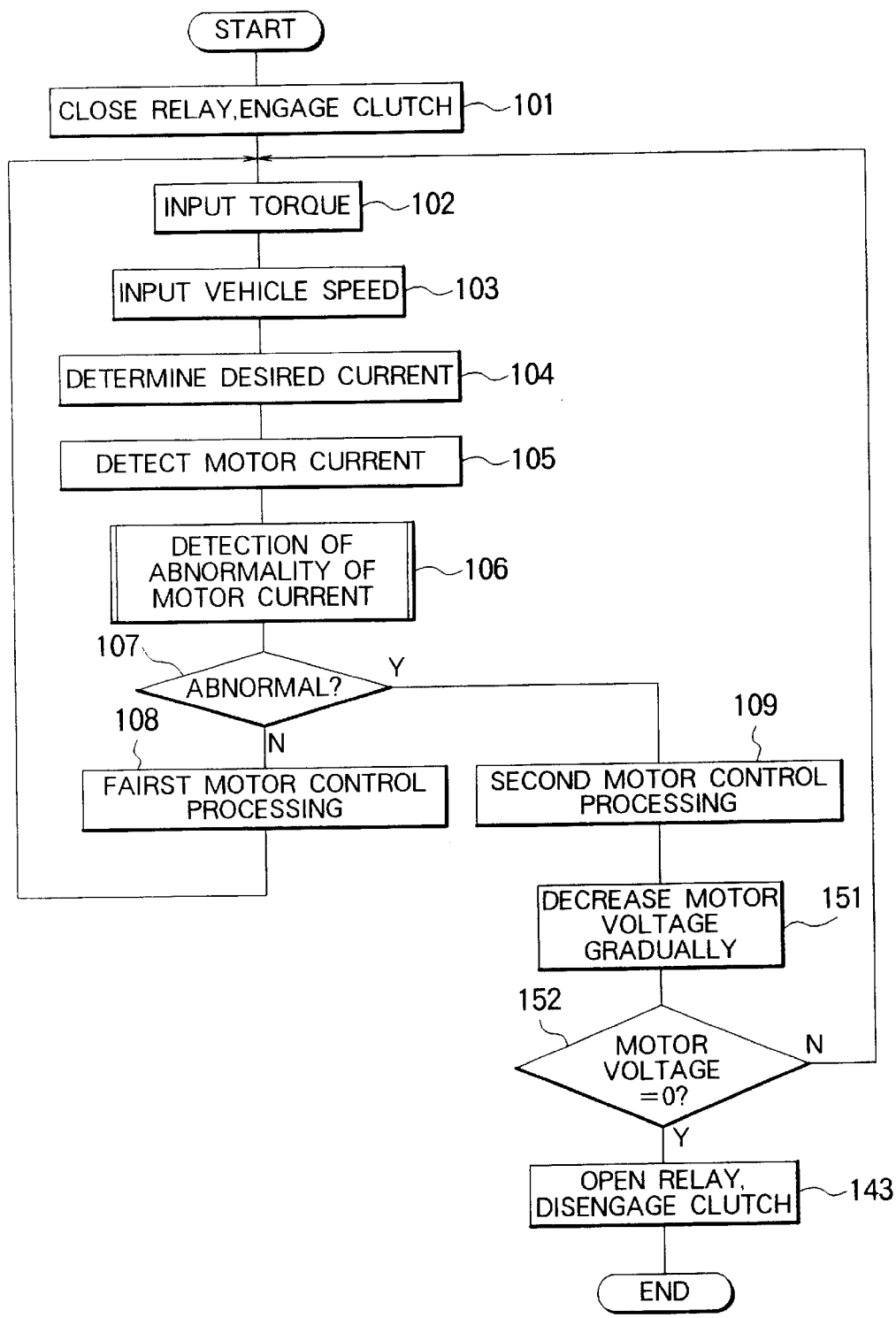
FIG. 19 is a flow chart for illustrating control operation according to a sixth implementation mode.

According to the instant implementation mode, the second motor control processing is carried out in such a manner as illustrated in a flow chart of FIG. 19. When the motor control procedure is changed over to the second motor control processing, processing for lowering the motor voltage gradually is executed in a step 151, which is then followed by a step 152 for deciding whether or not the motor voltage is zero. If the motor voltage is zero, the relay 21 is opened with the clutch 9 being disengaged in a step 143.

Figure 20:
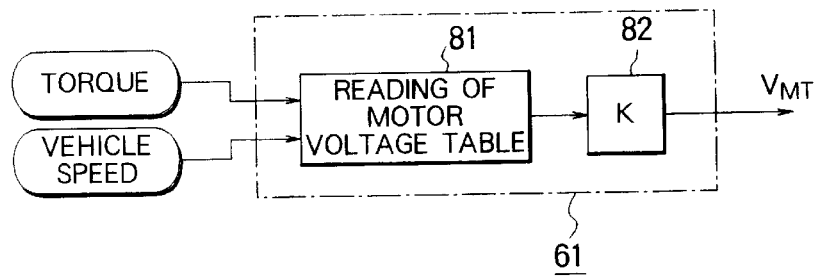
FIG. 20 is a block diagram illustrating functionally control operation for gradually decreasing a motor voltage as executed by the microcomputer in the sixth implementation mode.

FIG. 20 is a block diagram for illustrating hardwarewise the second motor control processing according to the instant implementation mode. Referring to the block diagram, the desired voltage determining means 61 is comprised of a motor-voltage table reading unit 71 for reading out from a motor voltage table the desired motor voltage value VMT preset on the basis of the relations between the steering torque and the vehicle speed illustrated in FIG. 12 and a multiplication unit 82 for multiplying the desired motor voltage value VMT as read out by a coefficient k to thereby output an actual desired motor voltage value IMT.

Figure 21:
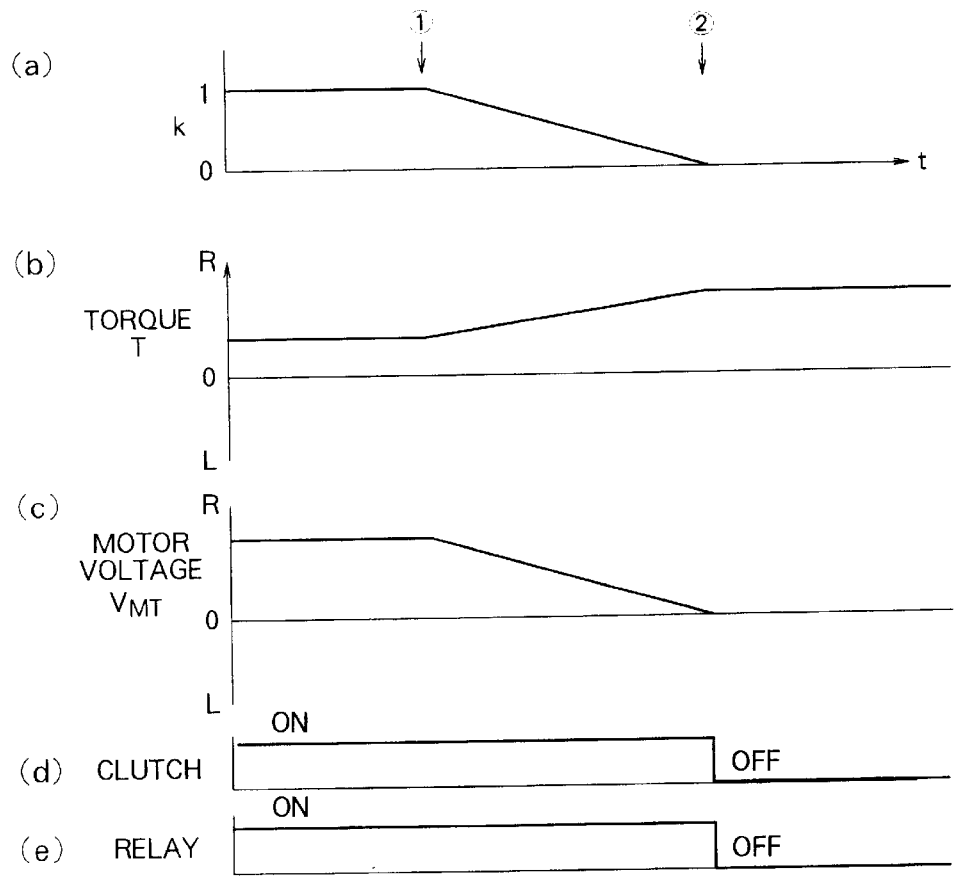
FIG. 21 is a timing chart illustrating states of various control factors as inputted upon steep steering operation after detection of abnormality of the motor current in the sixth implementation mode.

Next, description will be directed to operation by referring to timing charts shown in FIG. 21 at (a) to (e), respectively. Shown in the figure at (a) is change of numerical value of the coefficient k while shown at (b) in the same figure is change of the steering torque T. Further, change of the desired motor voltage value VMT in accompanying the numerical value change of the coefficient k is shown at (c) in the same figure, the driving state of the clutch 9 is shown at (d) in the same figure and the driving state of the relay 21 is shown at (e) in the same figure.

At a time point ① shown at (a) in the same figure, abnormality of the motor voltage is detected, whereupon the first motor control processing is changed over to the second motor control processing. In that case, the coefficient k is decreased gradually from "1" to assume "0" at a time point ②.

As a consequence, the desired motor voltage value VMT decreases as the coefficient k decreases, whereby the desired motor voltage value VTM becomes smaller to thereby lower the assist torque generated by the motor 8, which leads to gradual increase of the steering torque. After the desired motor voltage value VMT becomes zero, the clutch 9 is disengaged with the relay 21 being opened to thereby stop the motor-driven power steering. Thus, the steering operation is changed over to the manual steering mode.

Owing to the processing procedure described above, the control can be continued without generating excessively large assist torque even when abnormality takes place in the motor voltage detecting circuit 24 as in the case of the first implementation mode.

Further, by lowering gradually the assist torque generated by the motor 8 during a period intervening between the detection of the current abnormality and the change-over to the manual steering mode, the manual steering can be effectuated without being accompanied by steep change of the assist torque, whereby safety of the steering operation can be enhanced.

Implementation Mode 7

Figure 22:
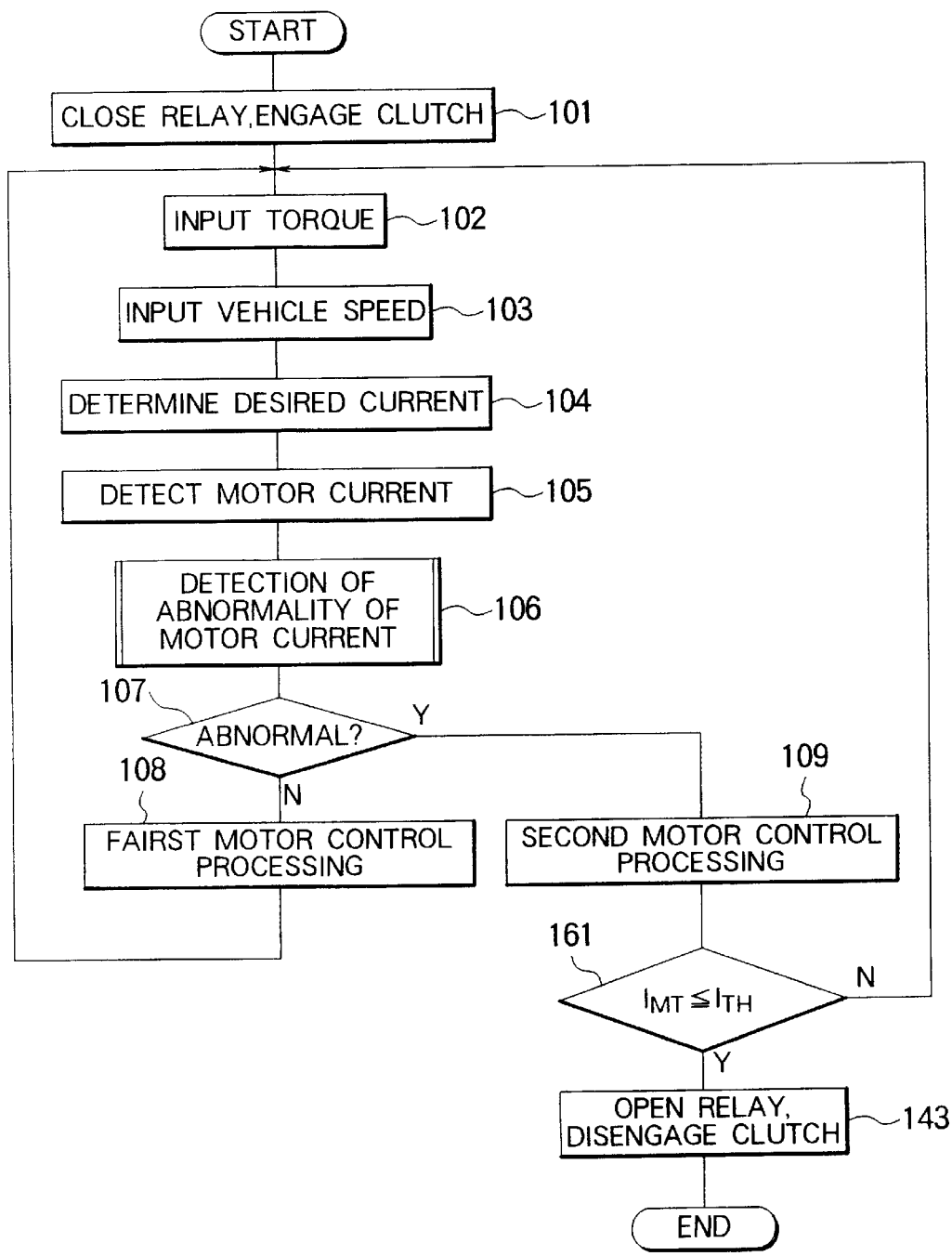
FIG. 22 is a flow chart for illustrating power steering control operation according to a seventh implementation mode.

In the case of the instant implementation mode, the second motor control processing is modified in such a manner as illustrated in the flow chart shown in FIG. 22. In a step 161 in the flow chat of FIG. 22, decision is made whether or not the desired motor current value IMT determined in the step 104 is smaller than a predetermined value ITH (e.g. zero ampere) inclusive. If it is equal to or smaller than the predetermined value ITH, the relay 21 is opened with the clutch 9 being disengaged in the step 143 to terminate the power steering control.

On the other hand, when it is decided in the step 161 that the desired motor current value IMT is greater than the predetermined value ITH, the processing starting from the step 102 is executed repetitively.

Figure 23:
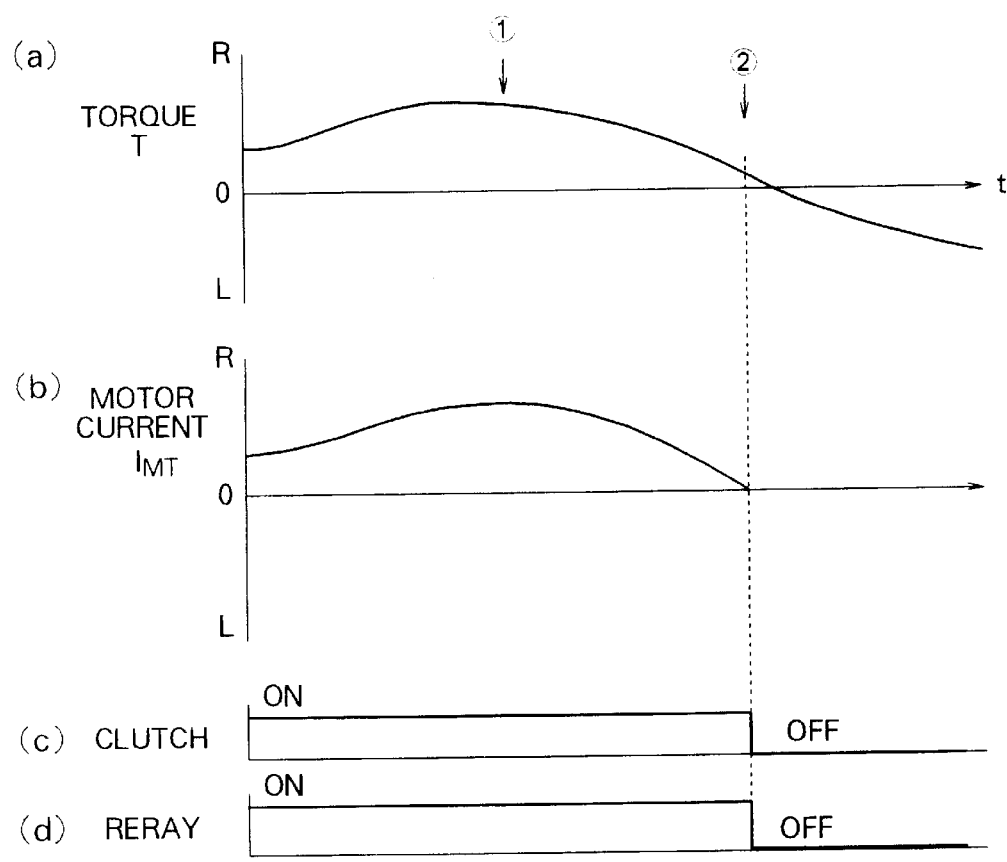
FIG. 23 is a timing chart illustrating states of various control factors as inputted upon steep steering operation after detection of abnormality of the motor current in the seventh implementation mode.

Next, description will turn to the operation of the system according to the instant implementation mode by referring to timing charts shown in FIG. 23 at (a) to (d). In the figure, change of the steering torque T is shown at (a), change of the desired motor current value IMT is shown at (b), driving of the clutch is shown at (c) and driving of the relay is shown at (d). When the motor current abnormality is detected at a time point ① shown at (a) in the figure, the control procedure is changed over to the second motor control processing.

Figure 24:
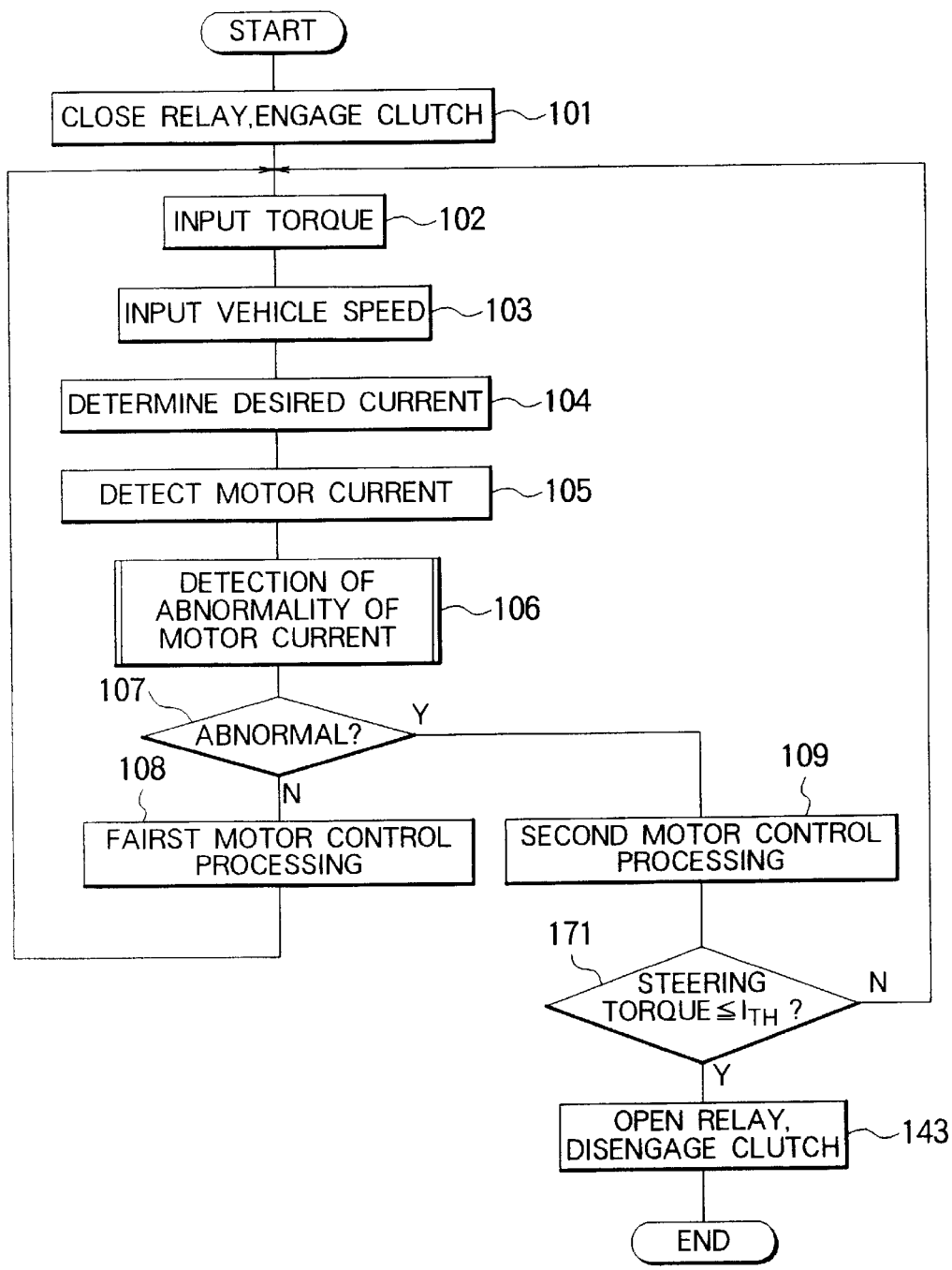
FIG. 24 is a flow chart for illustrating power steering control operation according to an eighth implementation mode.

By executing the second motor control processing as illustrated in the flow chart in FIG. 24, the power steering control can be continued through the second motor control processing even when the motor current abnormality is detected in the course of steering operation (time point ①).

When the steering force becomes lower, the relay 21 is opened with the clutch 9 disengaged at the time point ② at which the motor current becomes zero, to thereby terminate the power steering control.

By virtue of the arrangement described above, the motor 8 can be controlled without generating excessively large assist torque notwithstanding of occurrence of the motor current abnormality, as in the case of the first implementation mode. Furthermore, since change-over to the manual steering is enabled by deenergizing the relay 9 and decoupling the clutch 21 in the state where no assist torque is generated by the motor 8, it is possible to change over the power steering to the manual steering safely without incurring any steep change of the assist torque.

Implementation Mode 8

In the case of the instant implementation mode, the second motor control processing is modified in such a manner as illustrated in the flow chart shown in FIG. 24. In a step 171 shown in the flow chat, decision is made whether or not the steering torque detected in the step 102 is smaller than a predetermined value TTH (e.g. 1 N·m) inclusive.

If the steering torque is equal to or smaller than the predetermined value TTH, the relay 21 is opened with the clutch 9 being disengaged in the step 143 to thereby terminate the power steering control. On the other hand, when it is decided in the step 171 that the steering torque is greater than the predetermined value TTH, the processing starting from the step 102 is executed repetitively.

Figure 25:
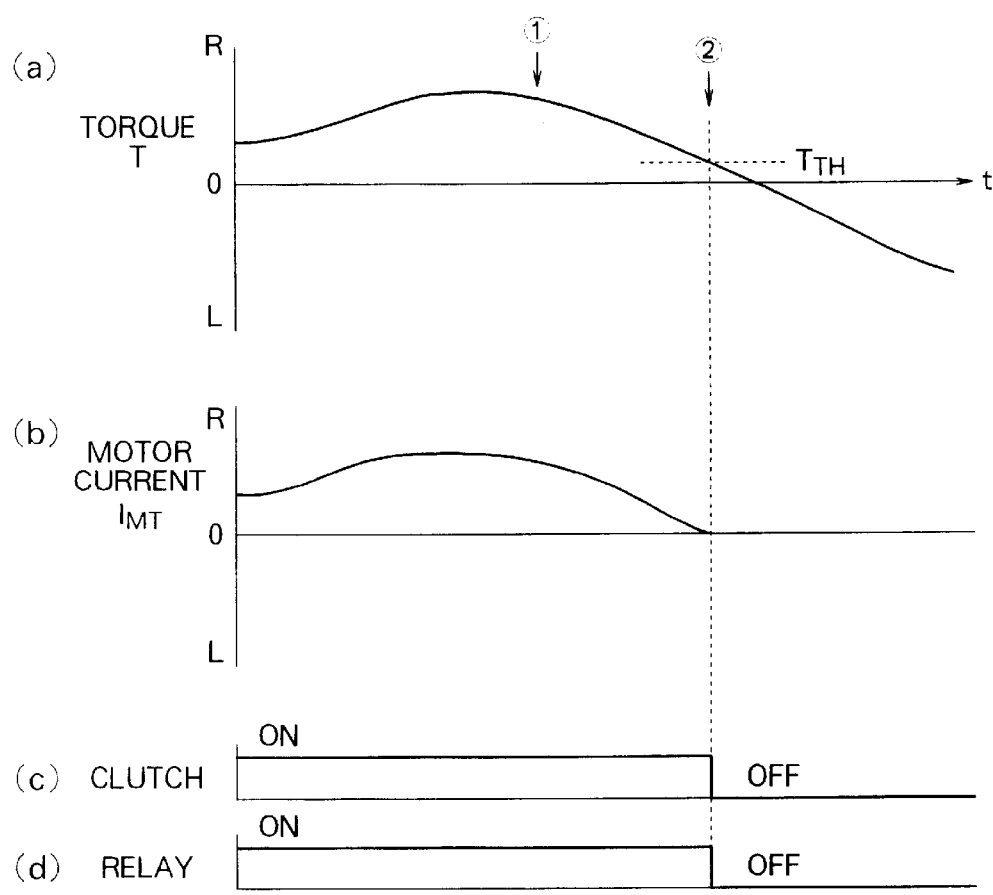
FIG. 25 is a timing chart illustrating states of various control factors as inputted upon steep steering operation after detection of abnormality of the motor current in the eighth implementation mode.
Figure 26:
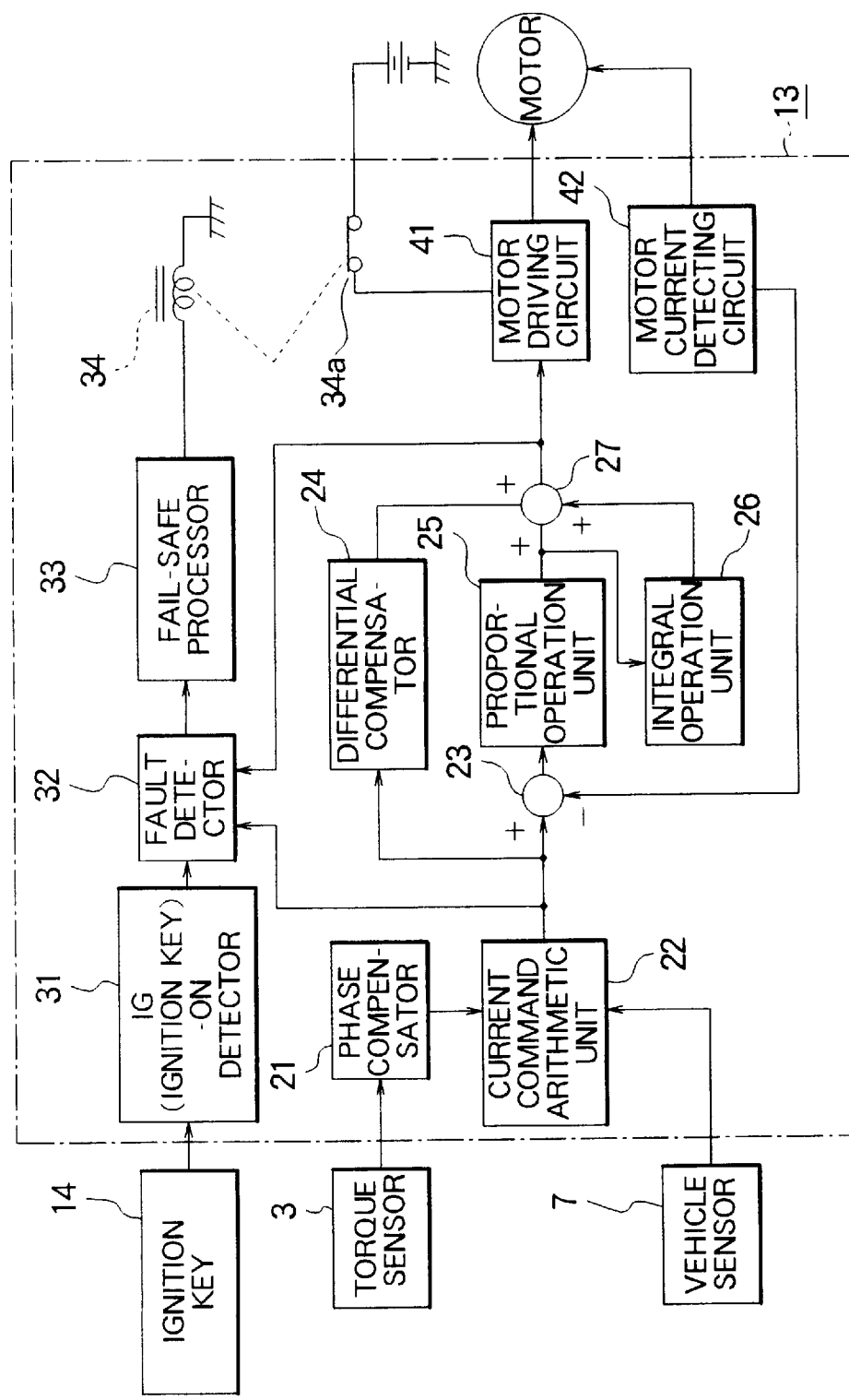
FIG. 26 is a view showing an arrangement of a conventional motor-driven power steering control system.

Next, description will turn to the second motor control processing according to the instant implementation mode by referring to timing charts shown in FIG. 25 at (a) to (d). In the figure, change of the steering torque T is shown at (a), change of the desired motor current value IMT is shown at (b), driving of the clutch is shown at (c) and driving of the relay is shown at (d) in the same figure.

The motor current abnormality is detected at a time point ① shown at (a) in the figure, whereon the control procedure is changed over to the second motor control processing. By executing the second motor control processing as shown in FIG. 24, the power steering control can be continued by executing the second motor control processing even when the motor current abnormality is detected in the course of steering operation (at a timing ①). When the steering force becomes lower, the relay 21 is opened with the clutch 9 being disengaged at a timing ② at which the steering torque is not greater than the predetermined value TTH, to thereby stop the power steering control.

By virtue of the processing described above, the motor can be controlled without generating excessive assist torque notwithstanding of occurrence of the motor current abnormality, as in the case of the first implementation mode. Besides, since change-over to the manual steering is enabled by deenergizing the relay 21 and disengaging the clutch 9 in the state where the steering torque is sufficiently small, it is possible to change over the power steering to the manual steering safely without incurring any steep change of the assist torque.

INDUSTRIAL APPLICABILITY

As is apparent from the foregoing description, in the motor-driven power steering control system according to the present invention, detection of the abnormality of the motor current detecting circuit is constantly carried out in the power steering control mode, wherein the control of the motor for the power steering control can be validated even in the state where the motor current detecting circuit suffers abnormality while change-over to the manual steering can be realized safely after detection of the abnormality without incurring rapid change of the steering force. Thus, safety of the motor-driven power steering control system can be enhanced.

We claim:

1. A motor-driven power steering control system, characterized in that said system comprises a desired current determiner for determining previously a desired value of a current to be supplied to a motor, a motor current detector for detecting said motor current, a motor current controller having a first control process for controlling a motor current to be supplied to said motor through a closed loop control in accordance with said desired value and said detected motor current and a second control process for controlling the motor current to be supplied to said motor through an open loop control in accordance with said desired value, and an abnormality detector for making a decision whether or not said detected motor current suffers abnormality to thereby change over the control of said motor current to said second control process upon decision of abnormality; and wherein said motor current controller performs open loop control of the motor current through said second control process on the basis of a resistance value of the motor and the desired value of the motor current.

2. A motor-driven power steering control system set forth in claim 1, characterized in that when the abnormality detector decides normality of the motor current in the course of the motor control through the second control process, the motor is then controlled through the first control process.

3. A motor-driven power steering control system set forth in claim 1, characterized in that said system comprises a controller for stopping power steering control when the motor current becomes lower than a predetermined value inclusive by decreasing gradually the desired value of the motor current in the course of the motor control through the second control process validated upon detection of abnormality by the abnormality detector.

4. A motor-driven power steering control system set forth in claim 1, characterized in that said system comprises a controller for stopping power steering control when the motor current becomes lower than a predetermined value inclusive in the course of the motor control through the second control process validated upon detection of abnormality by the abnormality detector.

5. A motor-driven power steering control system set forth in claim 1, characterized in that said system comprises a controller for stopping power steering control when a steering torque becomes lower than a predetermined value inclusive in the course of the motor control through the second control process validated upon detection of abnormality by the abnormality detector.

6. A motor-driven power steering control system set forth in claim 1, characterized in that said abnormality detector decides abnormality of the motor current when a time period for which a deviation between the desired motor current value and the motor current detection value is equal to or exceeds a predetermined value has continued longer than a predetermined time.

7. A motor-driven power steering control system, characterized in that said system comprises a desired current determiner for determining previously a desired value of a current to be supplied to a motor, a motor current detector for detecting said motor current, a motor current controller having a first control process for performing a closed loop control of the motor current to be supplied to said motor by using at least a proportional term and an integral term of the control process on the basis of said detected motor current and said desired value and a second control process for performing a closed loop control by using said proportional term on the basis of said detected motor current and said desired value, and an abnormality detector for making a decision whether or not said detected motor current suffers abnormality, to thereby change over the control of said motor current to said second control process upon decision of abnormality.

8. The motor-driven power steering control system set forth in claim 7, wherein said second control process does not use said integral term.

9. The motor-driven power steering control system set forth in claim 7, characterized in that when the abnormality detector decides nonnality of the motor current in the course of the motor control through the second control process, the motor is then controlled through the first control process.

10. The motor-driven power steering control system set forth in claim 7, further comprising a controller for stopping power steering control when the motor current becomes lower than a predetermined value inclusive by decreasing gradually the desired value of the motor current in the course of the motor control through the second control process validated upon detection of abnormality by the abnormality detector.

11. The motor-driven power steering control system set forth in claim 7, further comprising a controller for stopping power steering control when the motor current becomes lower than a predetermined value inclusive in the course of the motor control through the second control process validated upon detection of abnormality by the abnormality detector.

12. The motor-driven power steering control system set forth in claim 7, further comprising a controller for stopping power steering control when a steering torque becomes lower than a predetermined value inclusive in the course of the motor control through the second control process validated upon detection of abnormality by the abnormality detector.

13. The motor-driven power steering control system set forth in claim 7, wherein said abnormality detector decides abnormality of the motor current when a time period for which a deviation between the desired motor current and the motor current detection value is equal to or exceeds a predetermined value has continued longer than a predetermined time.

14. A motor-driven power steering control system, characterized in that said system comprises a desired current determiner for determining previously a desired value of a current to be supplied to a motor, a motor current detector for detecting said motor current, a desired voltage determiner for determining a desired value of an application voltage to be applied to said motor, a motor current controller having a first control process for performing a closed loop control of a motor current to be supplied to said motor in accordance with the desired value of the current to be supplied to said motor and said detected motor current and a second control process for controlling the voltage applied to the motor on the basis of the desired value of said application voltage, and an abnormality detector for making a decision whether or not said detected motor current suffers abnormality, to thereby change over the control of said motor current to said second control process upon decision of abnormality.

15. A motor-driven power steering control system set forth in claim 14, characterized in that said system comprises a controller for stopping power steering control when the applied voltage becomes lower than a predetermined value inclusive by decreasing gradually a voltage applied to the motor in the course of the motor control through the second control process validated upon detection of abnormality by the abnormality detector.

16. A motor-driven power steering control system set forth in claim 4, characterized in that said system comprises a controller for stopping power steering control when a desired value of the voltage applied to the motor becomes lower than a predetermined value inclusive in the course of the motor control through the second control process validated upon detection of abnormality by the abnormality detector.

17. The motor-driven power steering control system set forth in claim 14, characterized in that when the abnormality detector decides normality of the motor current in the course of the motor control through the second control process, the motor is then controlled through the first control process.

18. The motor-driven power steering control system set forth in claim 14, further comprising a controller for stopping power steering control when a steering torque becomes lower than a predetermined value inclusive in the course of the motor control through the second control process validated upon detection of abnormality by the abnormality detector.

19. The motor-driven power steering control system set forth in claim 14, wherein said abnormality detector decides abnormality of the motor current when a time period for which a deviation between the desired motor current and the motor current detection value is equal to or exceeds a predetermined value has continued longer than a predetermined time.

* * * * *